US010150821B2

(12) United States Patent
Hagadorn et al.

(10) Patent No.: US 10,150,821 B2
(45) Date of Patent: Dec. 11, 2018

(54) HETEROCYCLIC AMIDO TRANSITION METAL COMPLEXES, PRODUCTION AND USE THEREOF

(71) Applicant: ExxonMobil Chemical Patents Inc., Baytown, TX (US)

(72) Inventors: John R. Hagadorn, Houston, TX (US); Jo Ann M. Canich, Houston, TX (US); Alexander Z. Voskoboynikov, Moscow (RU); Pavel S. Kulyabin, Moscow (RU); Georgy P. Goryunov, Moscow (RU); Dmitry V. Uborsky, Moscow (RU)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/637,834

(22) Filed: Jun. 29, 2017

(65) Prior Publication Data
US 2018/0030162 A1 Feb. 1, 2018

Related U.S. Application Data

(60) Provisional application No. 62/368,511, filed on Jul. 29, 2016.

(51) Int. Cl.
*C08F 4/62* (2006.01)
*C08F 4/76* (2006.01)
*C08F 10/06* (2006.01)
*C08F 297/08* (2006.01)
*C08F 10/02* (2006.01)
*C08F 4/64* (2006.01)
*C08F 4/659* (2006.01)

(52) U.S. Cl.
CPC ...... *C08F 4/62141* (2013.01); *C08F 4/64144* (2013.01); *C08F 4/64148* (2013.01); *C08F 4/65912* (2013.01); *C08F 4/76* (2013.01); *C08F 10/02* (2013.01); *C08F 10/06* (2013.01); *C08F 297/083* (2013.01)

(58) Field of Classification Search
None
See application file for complete search history.

(56) References Cited

U.S. PATENT DOCUMENTS

| 6,103,657 | A | 8/2000 | Murray |
| 6,175,409 | B1 | 1/2001 | Nielsen et al. |
| 6,260,407 | B1 | 7/2001 | Petro et al. |
| 6,294,388 | B1 | 9/2001 | Petro |
| 6,308,658 | B1 | 10/2001 | Steckel |
| 6,406,632 | B1 | 6/2002 | Safir et al. |
| 6,436,292 | B1 | 8/2002 | Petro |
| 6,454,947 | B1 | 9/2002 | Safir et al. |
| 6,455,316 | B1 | 9/2002 | Turner et al. |
| 6,461,515 | B1 | 10/2002 | Safir et al. |
| 6,475,391 | B2 | 11/2002 | Safir et al. |
| 6,489,168 | B1 | 12/2002 | Wang et al. |
| 6,491,816 | B2 | 12/2002 | Petro |
| 6,491,823 | B1 | 12/2002 | Safir et al. |
| 6,900,321 | B2 | 5/2005 | Boussie et al. |
| 7,423,101 | B2 | 9/2008 | Solan et al. |
| 7,973,116 | B2 | 7/2011 | Hagadorn et al. |
| 8,049,015 | B2 | 11/2011 | Hutchinson et al. |
| 2002/0142912 | A1 | 10/2002 | Boussie et al. |
| 2004/0220050 | A1 | 11/2004 | Frazier et al. |
| 2006/0135722 | A1 | 6/2006 | Boussie et al. |
| 2007/0135575 | A1 | 6/2007 | Hustad et al. |
| 2010/0227990 | A1 | 9/2010 | Kuhlman et al. |
| 2011/0224391 | A1 | 9/2011 | Hagadorn et al. |

FOREIGN PATENT DOCUMENTS

| CN | 103319311 | 9/2013 |
| WO | 2004/085497 | 10/2004 |
| WO | 2007/067965 | 6/2007 |
| WO | 2007/130307 | 11/2007 |
| WO | 2015/073610 | 5/2015 |
| WO | 2015/134213 | 9/2015 |

OTHER PUBLICATIONS

Karpov et al., "Yttrium Complexes Featuring Different Y-C Bonds. Comparitive Reactivity Studies: Toward Terminal Imido Complexes," Organometallics, vol. 32, No. 8, 2013, pp. 2379-2388.
Froese et al., (Mechanism of Activation of a Hafnium Pyridyl-Amide Olefin Polymerization Catalyst: Ligand Modification by Monomer, Journal of American Chemical Society, 2007, vol. 129, pp. 7831-7840.
Domski et al., "Living Alkene Polymerization: New Methods for the Precision Synthesis of Polyolefins," Prog. Polymer Science, 2007, vol. 32, No. 1, pp. 30-92.
Giambastiani et al., "Imino- and amido-pyridinate d-block metal complexes in polymerization/oligomerization catalysis," Olefin Upgrading Catalysis by Nitrogen-based Metal Complexes 1, Catalysis by Metal Complexes, Chapter 5, Springer, 2011, pp. 197-281.
Vaughan et al., "Industrial Catalysts for alkene Polymerization," Comprehensive Polymer Science, vol. 3, Chapter 20, 2012, pp. 657-672.
Gibson et al., "Advances in Non-Metallocene Olefin Polymerization Catalysts," Chem. Rev., 2003, vol. 103, pp. 283-315.
Britovsek et al., "The Search for New-Generation Olefin Polymerization Catalysts: Life beyond Metallocenes," Angew. Chem. Int. Ed., 1999, vol. 38, No. 4, pp. 428-447.

(Continued)

*Primary Examiner* — Catherine S Branch
(74) *Attorney, Agent, or Firm* — Catherine L. Bell

(57) ABSTRACT

Heterocyclic amido transition metal complexes are disclosed for use in alkene polymerization to produce polyolefins, preferably multimodal polyolefins. The heterocyclic amido transition metal complexes are formed by the chelation of a tridentate dianionic heterocyclic amido ligand to a group 3, 4, or 5 transition metal, where the tridentate ligand coordinates to the metal forming a five-membered ring and an eight-membered ring.

49 Claims, No Drawings

(56) References Cited

OTHER PUBLICATIONS

Sarkar et al., "NCN Trianionic Pincer Ligand Precursors: Synthesis of Bimetallic, Chelating Diamide, and Pincer Group IV Complexes," Inorganic Chemistry, 2010, vol. 49, No. 11, pp. 5143-5156.
Scott et al., "Coupling of Carbon Monoxide to Isocyanides and Enones Induced by Alkyl Zr(IV) and Hf(IV) Tropocoronand Complexes," Journal of American Chemical Society, 1997, vol. 119, No. 14, pp. 3411-3412.
Scott et al., "Isocyanide Insertion Reactions with Organometallic Group 4 Tropocoronand Complexes: formation of n2-Iminoacyl, Enediamido, n2-Imine, and u-Imido Products," Organometallics, 1997, vol. 16, No. 26, pp. 5857-5868.
Scott et al., "Reactivity of the Coordinated n2-Ketone in the Tropocoronand Complex [Hf(TC-3,5)(n2-OC(CH2Ph)2)]: N-C Coupling, C-C Coupling, and Insertion into the C-O Bond," Organometallics, 1998, vol. 17, No. 3, pp. 466-474.
Scott et al., "Synthesis and characterization of Zr(IV) and Hf(IV) tropocoronand complexes," Inorganica Chimica Acta, 1997, 263, Nos. 1-2, pp. 287-299.
Murphy et al., "A Fully Integrated High-Throughput Screening Methodology for the Discovery of New Polyolefin Catalysts: Discovery of a New Class of High Temperature Single-Site Group (IV) Copolymerization Catalysts," Journal of the American Chemical Society, 2003, vol. 125, No. 14, pp. 4306-4317.

HETEROCYCLIC AMIDO TRANSITION METAL COMPLEXES, PRODUCTION AND USE THEREOF

PRIORITY CLAIM

The present application claims priority to and the benefit of U.S. Ser. No. 62/368,511, filed Jul. 29, 2016 and is incorporated by reference in its entirety.

FIELD OF THE INVENTION

The invention relates to heterocyclic amido transition metal complexes and intermediates and processes for use in making such heterocyclic amido complexes. The transition metal complexes may be used as catalysts for alkene polymerization processes.

BACKGROUND OF THE INVENTION

Pyridyl amines have been used to prepare Group 4 complexes which are useful transition metal components in the polymerization of alkenes, see for example, US 2002/0142912, U.S. Pat. No. 6,900,321, and U.S. Pat. No. 6,103,657, where the ligands have been used in complexes in which the ligands are coordinated in a bidentate or tridentate fashion to the transition metal atom, wherein the pyridylamide ligand is chelated to the transition metal with the formation of five membered rings.

Davies and Solan describe in WO 2005/095469 catalyst compounds that use tridentate ligands through two nitrogen atoms (one amido and one pyridyl) and one oxygen atom, wherein the tridentate ligand is chelated to the transition metal with the formation of five and six membered rings.

US 2004/0220050 A1 and WO 2007/067965 disclose complexes in which the ligand is coordinated in a tridentate fashion through two nitrogen (one amido and one pyridyl) and one carbon (aryl anion) donors, wherein the pyridylamide ligand is chelated to the transition metal with the formation of five membered rings.

The above mentioned pyridyl amide complexes are known to undergo insertion of an alkene into the metal-aryl bond of the catalyst precursor during activation (Froese, R. D. J. et al., J. Am. Chem. Soc. 2007, 129, 7831-7840) to form an active catalyst that has a tridentate ligand chelated to the transition metal with five and seven membered rings.

Kuhlman and Whiteker disclose in US 2010/0227990 pyridylamide complexes in which the ligand is chelated in a tridentate fashion through two nitrogen (one amido and one pyridyl) and one carbon (alkyl anion) donors, with the formation of five and seven membered rings.

WO 2010/037059 discloses pyridine containing amines for use in pharmaceutical applications.

U.S. Pat. No. 7,973,116 and US 2011/0224391 describe pyridyldiamide complexes in which the ligand is chelated in a tridentate fashion through three nitrogen donors (two amido and one pyridyl), with the formation of five and seven membered rings.

WO 2007/130307 describes hafnium complexes of heterocyclic ligands in which the ligand is chelated in a tridentate fashion through two nitrogen (one amido and one heterocyclic Lewis base) and one carbon (aryl anion) donor, with the formation of five and six membered rings.

Other references of interest include: 1) Domski, G. J.; Rose, J. M.; Coates, G. W.; Bolig, A. D.; Brookhart, M. "Living alkene polymerization: New methods for the precision synthesis of polyolefins" Prog. Polym. Sci. 2007, 32, 30-92; 2) Giambastiani, G.; Laconi, L.; Kuhlman, R. L.; Hustad, P. D. "Imino- and amido-pyridinate d-block metal complexes in polymerization/oligomerization catalysis" Chapter 5 in Olefin Upgrading Catalysis by Nitrogen-based Metal Complexes I, Catalysis by Metal Complexes, Springer, 2011; 3) Vaughan, A; Davis, D. S.; Hagadorn, J. R. in Comprehensive Polymer Science, Vol. 3, Chapter 20, "Industrial catalysts for alkene polymerization", 2012; 4) Gibson, V. C.; Spitzmesser, S. K. Chem. Rev. 2003, 103, 283; 5) Britovsek, G. J. P.; Gibson, V. C.; Wass, D. F. Angew. Chem. Int. Ed. 1999, 38, 428; 6) Inorganic Chemistry (2010) 49, (11), 5143-5156; 7) JACS, (1997) 119(14), 3411-3412; 8) Organometallics, (1997) 16(26), 5857-5868; 9) Organometallics, (1998), 17(3), 466-474; and 10) Inorganica Chimica Acta, (1997), 263(1-2), 287-299.

There still is need for new catalysts complexes with enhanced performance in alkene polymerization.

Further, there is a need in the art for new catalysts with no symmetry (i.e., $C_1$ point group symmetry) that can polymerize alpha olefins to yield crystalline polymers.

SUMMARY OF THE INVENTION

New catalyst compositions for olefin polymerizations are described herein featuring a group 3, 4, or 5 metal bound to a tridentate dianionic ligand that chelates to the metal center with a five-membered ring and an eight-membered ring. These novel catalyst compositions are shown herein to be active for olefin polymerization, especially for preparation of polymers containing ethylene.

This invention relates to novel transition metal complexes of dianionic tridentate ligands containing at least one amido donor group, wherein the tridentate ligand chelates to the metal in such a manner to form both five- and eight-membered rings. This invention also relates to heterocyclic amido transition metal complexes represented by the formula (A), (B), (C), or (D):

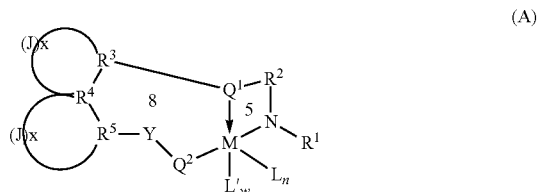

(A)

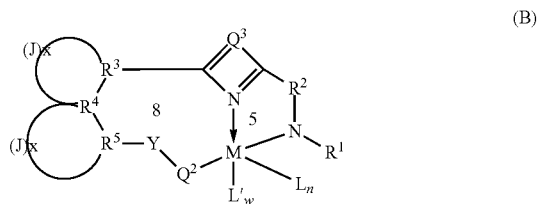

(B)

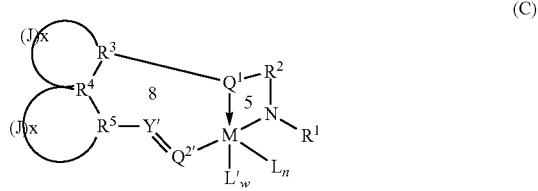

(C)

-continued

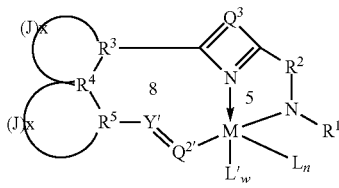

(D)

wherein:

M is a Group 3, 4, or 5 metal;

$Q^1$ is a group that links $R^2$ and $R^3$ by a three atom bridge represented by the formula: -$G^1$-$G^2$-$G^3$- where $G^2$ is a group 15 or 16 atom that forms a dative bond to M, $G^1$ and $G^3$ are each a group 14 atom that are joined together by two or three additional group 14, 15, or 16 atoms to form a heterocycle or substituted heterocycle;

$Q^2$ is a group that forms an anionic bond with M, said $Q^2$ group being selected from O, S, $CH_2$, $CHR^{17}$, $C(R^{17})_2$, $NR^{17}$, or $PR^{17}$, where each $R^{17}$ is independently selected from hydrogen, halogen, hydrocarbyls, substituted hydrocarbyls, halocarbyls, substituted halocarbyls, silylcarbyls, and polar groups;

$Q^{2'}$ is a group that forms an anionic bond with M, said $Q^{2'}$ group being selected from N, P, CH, or $CR^{17}$ where $R^{17}$ is defined as above;

$Q^3$ is -(T-T)- or -(T-T-T)-, where each T is a substituted or unsubstituted group 14, 15, or 16 element so that together with the "—C—N=C—" fragment it forms a 5- or 6-membered heterocycle or substituted heterocycle;

$R^1$ is selected from hydrocarbyls, substituted hydrocarbyls, halocarbyls, substituted halocarbyls, and silylcarbyls;

$R^2$ is -$E(R^{12})(R^{13})$— where E is carbon, silicon, or germanium, and each $R^{12}$ and $R^{13}$ is independently selected from the group consisting of hydrogen, halogen, hydrocarbyls, substituted hydrocarbyls, halocarbyls, substituted halocarbyls, silylcarbyls, and polar groups; $R^3$ is either C or N, and $R^4$ and $R^5$ are C, and $R^3$ and $R^4$ are part of a five or six-membered carbocyclic or heterocyclic ring, which may be substituted or unsubstituted, and $R^4$ and $R^5$ are part of a five or six-membered carbocyclic or heterocyclic ring, which may be substituted or unsubstituted;

each J is independently selected from C, CH, $CH_2$, $CR^{18}$, $CHR^{18}$, $C(R^{18})_2$, $Si(R^{18})_2$, $SiH(R^{18})$, NH, $NR^{18}$, O, or S, where $R^{18}$ is selected from hydrocarbyls, substituted hydrocarbyls, halocarbyls, substituted halocarbyls, halogen, and silylcarbyls;

each x is independently 3 or 4 representing the number of J groups linked together in series; Y is selected from substituted and unsubstituted group 14 elements including, but not limited to $CH_2$, $CH(R^{18})$, $C(R^{18})_2$, $C(O)$, and $C(NR^{18})$, where $R^{18}$ is defined as above, and wherein the heteroatom (such as O or N) is optionally bonded to M;

Y' is selected from substituted and unsubstituted group 14 elements including, but not limited to CH, $C(R^{18})$, where $R^{18}$ is defined as above;

L is an anionic leaving group, where the L groups may be the same or different and any two L groups may be linked to form a dianionic leaving group;

L' is neutral Lewis base;

n is 1, 2, or 3;

w is 0, 1, 2, or 3;

wherein n+w is not greater than 4;

wherein the tridentate dianionic ligand is chelated to the metal M in such a fashion that the complex features an eight-membered ring and a five-membered ring, which are indicated in the formulas (A) through (D) by the numbers 8 and 5, respectively.

This invention further relates to a process to make the above complex, process to make intermediates for the above complex and methods to polymerize olefins using the above complex.

This invention further relates to process to a polymerization process to produce polyolefin comprising contacting one or more olefin monomers with a catalyst system comprising the catalyst compounds described herein and activator, and obtaining polymer (such as by recovery process using liquid-solid, liquid-liquid, vapor-liquid, or vapor-solid separations) olefin polymer.

DETAILED DESCRIPTION OF THE INVENTION

The specification describes transition metal complexes. The term complex is used to describe molecules in which an ancillary ligand is coordinated to a central transition metal atom. The ligand may be coordinated to the transition metal by covalent bond and/or electron donation coordination or intermediate bonds. The transition metal complexes are generally subjected to activation to perform their polymerization or oligomerization function using an activator which is believed to create a cation as a result of the removal of an anionic group, often referred to as a leaving group, from the transition metal.

As used herein, the numbering scheme for the Periodic Table groups is the new notation as set out in Chemical and Engineering News, 63(5), 27 (1985).

For purposes of this invention and the claims thereto, Me is methyl, Et is ethyl, Bu is butyl, t-Bu and $^t$Bu are tertiary butyl, Pr is propyl, iPr and $^i$Pr are isopropyl, Cy is cyclohexyl, THF (also referred to as the is tetrahydrofuran, Bn is benzyl, and Ph is phenyl.

Unless otherwise indicated, the term "substituted" means that a hydrogen group has been replaced with a hydrocarbyl group, a heteroatom, or a heteroatom containing group. For example, methyl cyclopentadiene (Cp) is a Cp group substituted with a methyl group and ethyl alcohol is an ethyl group substituted with an —OH group.

The terms "hydrocarbyl radical," "hydrocarbyl," and "hydrocarbyl group" are used interchangeably throughout this document. Likewise, the terms "group," "radical," and "substituent" are also used interchangeably in this document. For purposes of this disclosure, "hydrocarbyl radical" is defined to be a $C_1$-$C_{100}$ radical, that may be linear, branched, or cyclic, and when cyclic, aromatic or non-aromatic.

Substituted hydrocarbyl radicals are radicals in which at least one hydrogen atom has been substituted with at least one functional group such as $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$ and the like or where at least one non-hydrocarbon atom or group has been inserted within the hydrocarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

Halocarbyl radicals are radicals in which one or more hydrocarbyl hydrogen atoms have been substituted with at least one halogen (e.g., F, Cl, Br, I) or halogen-containing group (e.g., $CF_3$).

Substituted halocarbyl radicals are radicals in which at least one halocarbyl hydrogen or halogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure.

Silylcarbyl radicals (also called silylcarbyls) are groups in which the silyl functionality is bonded directly to the indicated atom or atoms. Examples include $SiH_3$, $SiH_2R^*$, $SiHR^*_2$, $SiR^*_3$, $SiH_2(OR^*)$, $SiH(OR^*)_2$, $Si(OR^*)_3$, $SiH_2(NR^*_2)$, $SiH(NR^*_2)_2$, $Si(NR^*_2)_3$, and the like where R* is independently a hydrocarbyl or halocarbyl radical and two or more R* may join together to form a substituted or unsubstituted saturated, partially unsaturated or aromatic cyclic or polycyclic ring structure. Preferred silylcarbyls are of formula $SiR^*_3$.

Polar radicals or polar groups (also referred to as functional groups) are groups in which the heteroatom functionality is bonded directly to the indicated atom or atoms. They include heteroatoms of groups 13-17 of the periodic table either alone or connected to other elements by covalent or other interactions such as ionic, van der Waals forces, or hydrogen bonding. Examples of functional groups include carboxylic acid, acid halide, carboxylic ester, carboxylic salt, carboxylic anhydride, aldehyde and their chalcogen (Group 14) analogues, alcohol and phenol, ether, peroxide and hydroperoxide, carboxylic amide, hydrazide and imide, amidine and other nitrogen analogues of amides, nitrile, amine and imine, azo, nitro, other nitrogen compounds, sulfur acids, selenium acids, thiols, sulfides, sulfoxides, sulfones, phosphines, phosphates, other phosphorus compounds, silanes, boranes, borates, alanes, aluminates. Polar groups may also be taken broadly to include organic polymer supports or inorganic support material such as alumina, and silica. Preferred examples of polar groups include $NR^*_2$, $OR^*$, $SeR^*$, $TeR^*$, $PR^*_2$, $AsR^*_2$, $SbR^*_2$, $SR^*$, $BR^*_2$, $SnR^*_3$, $PbR^*_3$ and the like where R* is independently a hydrocarbyl, substituted hydrocarbyl, halocarbyl or substituted halocarbyl radical as defined above and two R* may join together to form a substituted or unsubstituted saturated, partially unsaturated or aromatic cyclic or polycyclic ring structure. Particularly preferred examples of polar groups include $NR^*_2$ and $PR^*_2$.

The term "catalyst system" is defined to mean a complex/activator pair. When "catalyst system" is used to describe such a pair before activation, it means the unactivated catalyst complex (precatalyst) together with an activator and, optionally, a co-activator. When it is used to describe such a pair after activation, it means the activated complex and the activator or other charge-balancing moiety. The transition metal compound may be neutral as in a precatalyst, or a charged species with a counter ion as in an activated catalyst system.

Complex, as used herein, is also often referred to as catalyst precursor, precatalyst, catalyst, catalyst compound, transition metal compound, or transition metal complex. These words are used interchangeably. Activator and cocatalyst are also used interchangeably.

A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments, a co-activator can be pre-mixed with the transition metal compound to form an alkylated transition metal compound.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

For the purposes of this invention, ethylene shall be considered an α-olefin.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol.

Unless otherwise noted all melting points ($T_m$) are DSC second melt.

A "ring carbon atom" is a carbon atom that is part of a cyclic ring structure. By this definition, a benzyl group has six ring carbon atoms and para-methylstyrene also has six ring carbon atoms.

The term "aryl" or "aryl group" means a six carbon aromatic ring and the substituted variants thereof, including but not limited to, phenyl, 2-methyl-phenyl, xylyl, 4-bromo-xylyl. Likewise, heteroaryl means an aryl group where a ring carbon atom (or two or three ring carbon atoms) has been replaced with a heteroatom, preferably N, O, or S.

The term "ring atom" means an atom that is part of a cyclic ring structure. By this definition, a benzyl group has six ring atoms and tetrahydrofuran has 5 ring atoms.

The terms heteroaryl, heterocycle, heterocyclic ring, and heterocyclic ligand are used interchangeably throughout this document.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring. A heterocyclic ring may be saturated, aromatic, pseudoaromatic, partially unsaturated or fully unsaturated. A substituted heterocycle is a heterocyclic ring that has had a hydrogen group on the ring atoms replaced with a hydrocarbyl, a heteroatom, a polar group or a substituted hydrocarbyl.

As used herein the term "aromatic" also refers to pseudoaromatic heterocycles which are heterocyclic substituents that have similar properties and structures (nearly planar) to aromatic heterocyclic ligands, but are not by definition aromatic; likewise, the term aromatic also refers to substituted aromatics.

The terms carbocycle, carbocyclic ring and carbocyclic ligand are used interchangeably throughout this document. A carbocycle is a ring of carbon atoms that may be saturated, unsaturated, or aromatic. Carbocycles may be fused together to form carbocycles containing multiple rings, such as indane, naphthalene or anthracene. A substituted carbocycle is a ring of carbon atoms that has had a hydrogen group on the ring atoms replaced with a hydrocarbyl, a heteroatom, a polar group or a substituted hydrocarbyl.

The term "continuous" means a system that operates without interruption or cessation. For example, a continuous process to produce a polymer would be one where the reactants are continually introduced into one or more reactors and polymer product is continually withdrawn.

A solution polymerization means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, Ind. Eng, Chem. Res. 29, 2000, 4627.

A bulk polymerization means a polymerization process in which the monomers and/or comonomers being polymerized are used as a solvent or diluent using little or no inert solvent as a solvent or diluent. A small faction of inert solvent might be used as a carrier for catalyst and scavenger. A bulk polymerization system contains less than 25 wt % of inert solvent or diluent, preferably less than 10 wt %, preferably less than 1 wt %, preferably 0 wt %.

Unless otherwise stated, "catalyst activity" is a measure of how many grams of polymer (P) are produced using a polymerization catalyst comprising W mmol of transition metal, over a period of time of T hours; and may be expressed by the following formula: P/(T×W).

Room temperature is 23° C. unless otherwise noted.

Catalyst Complexes

In a first aspect of the invention there is provided a heterocyclic amido transition metal complex (optionally for use in alkene polymerization) represented by the formula (A), (B), (C), or (D):

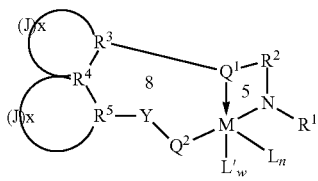

(A)

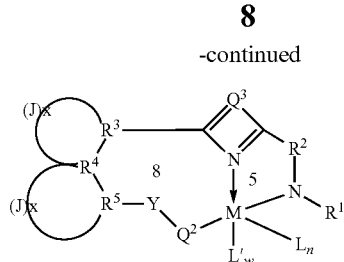

(B)

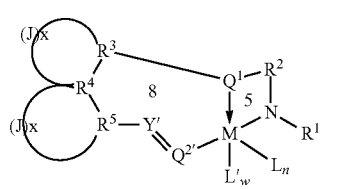

(C)

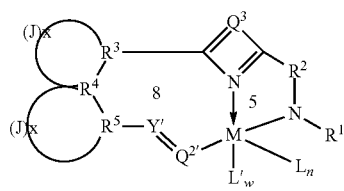

(D)

wherein:

M is a Group 3, 4, or 5 metal;

$Q^1$ is a group that links $R^2$ and $R^3$ by a three atom bridge represented by the formula:

-$G^1$-$G^2$-$G^3$- where $G^2$ is a group 15 or 16 atom that forms a dative bond to M, $G^1$, and $G^3$ are each a group 14 atom that are joined together by two or three additional group 14, 15, or 16 atoms to form a heterocycle or substituted heterocycle;

$Q^2$ is a group that forms an anionic bond with M, said $Q^2$ group being selected from O, S, $CH_2$, $CHR^{17}$, $C(R^{17})_2$, $NR^{17}$, or $PR^{17}$, where each $R^{17}$ is independently selected from hydrogen, halogen, hydrocarbyls, substituted hydrocarbyls, halocarbyls, substituted halocarbyls, silylcarbyls, and polar groups;

$Q^{2'}$ is a group that forms an anionic bond with M, said $Q^{2'}$ group being selected from N, P, CH, or $CR^{17}$ where $R^{17}$ is defined as above;

$Q^3$ is -(T-T)- or -(T-T-T)-, where each T is a substituted or unsubstituted group 14, 15, or 16 element so that together with the "—C—N=C—" fragment it forms a 5- or 6-membered heterocycle or substituted heterocycle;

$R^1$ is selected from hydrocarbyls, substituted hydrocarbyls, halocarbyls, substituted halocarbyls, and silylcarbyls;

$R^2$ is -E($R^{12}$)($R^{13}$)— where E is carbon, silicon, or germanium, and each $R^{12}$ and $R^{13}$ is independently selected from the group consisting of hydrogen, halogen, hydrocarbyls, substituted hydrocarbyls, halocarbyls, substituted halocarbyls, silylcarbyls, and polar groups;

$R^3$ is either C or N, and $R^4$ and $R^5$ are C, and $R^3$ and $R^4$ are part of a five or six-membered carbocyclic or heterocyclic ring, which may be substituted or unsubstituted, and $R^4$ and $R^5$ are part of a five or six-membered carbocyclic or heterocyclic ring, which may be substituted or unsubstituted;

each J is independently selected from C, CH, $CH_2$, $CR^{18}$, $CHR^{18}$, $C(R^{18})_2$, $Si(R^{18})_2$, $SiH(R^{18})$, NH, $NR^{18}$, O, or S, where $R^{18}$ is selected from hydrocarbyls, substituted hydrocarbyls, halocarbyls, substituted halocarbyls, halogen, and silylcarbyls;

each x is independently 3 or 4 representing the number of J groups linked together in series;

Y is selected from substituted and unsubstituted group 14 elements including, but not limited to CH$_2$, CH(R$^{18}$), C(R$^{18}$)$_2$, C(O), and C(NR$^{18}$), where R$^{18}$ is defined as above, and wherein the heteroatom (such as O or N) may be datively bonded to M;

Y' is selected from substituted and unsubstituted group 14 elements including, but not limited to CH, C(R$^{18}$), where R$^{18}$ is defined as above;

L is an anionic leaving group, where the L groups may be the same or different and any two L groups may be linked to form a dianionic leaving group;

L' is neutral Lewis base;

n is 1, 2, or 3;

w is 0, 1, 2, or 3;

wherein n+w is no greater than 4; and wherein the tridentate dianionic ligand is chelated to the metal M in such a fashion that the complex features an eight-membered ring and a five-membered ring, which are indicated in the formulas (A) through (D) by the numbers 8 and 5, respectively.

In another aspect of the invention there is provided a heterocyclic amido transition metal complex (optionally for use in alkene polymerization) represented by the formula (E), (F), (G), (H), (I), or (J).

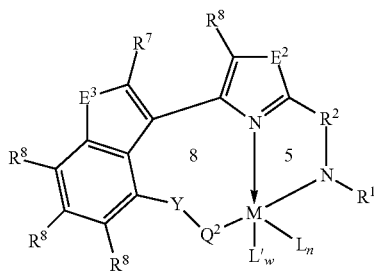
(E)

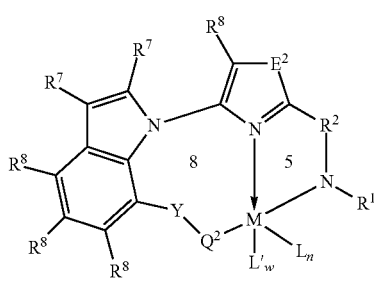
(F)

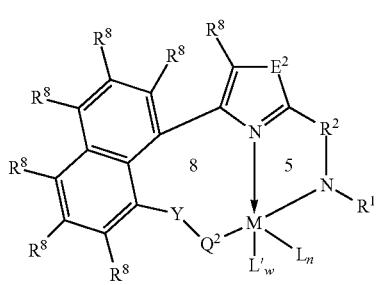
(G)

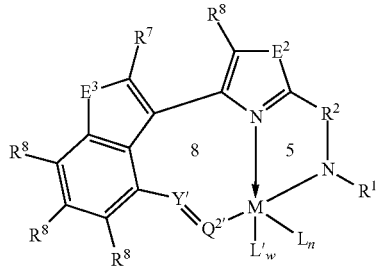
(H)

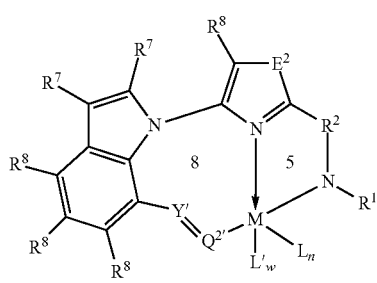
(I)

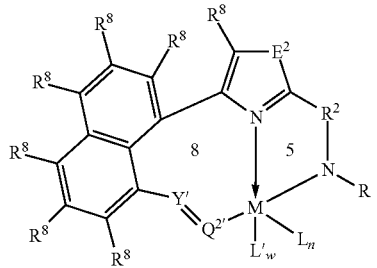
(J)

wherein:

M, R$^1$, R$^2$, L, L', n, w, Y, Y', Q$^2$, and Q$^{2'}$ are defined as above;

E$^2$ and E$^3$ are independently selected from O, S, NH, or NR$^9$, where R$^9$ is a hydrocarbyl, substituted hydrocarbyl, halocarbyl, substituted halocarbyl, halogen, silylcarbyl, or polar group;

each R$^7$ is independently selected from hydrogen, halogen, hydrocarbyl, substituted hydrocarbyl, halocarbyl, substituted halocarbyl, silylcarbyl, and polar groups, preferably hydrocarbyls;

each R$^8$ is independently selected from hydrogen, halogen, hydrocarbyl, substituted hydrocarbyl, halocarbyl, substituted halocarbyl, silylcarbyl, and polar groups, preferably hydrogen.

In any embodiment of the invention described herein, M may be Ti, Hf or Zr, preferably Hf or Zr.

In any embodiment of the invention described herein, Q$^1$ may be a substituted or unsubstituted imidazole, oxazole, or thiazole group linked to R$^3$ and R$^2$ through the carbons in the 2 and 4 positions of the heterocyclic ring with the G$^2$ group being the atom in the 3 position, using the numbering schemes shown below for imidazole, oxazole, and thiazole.

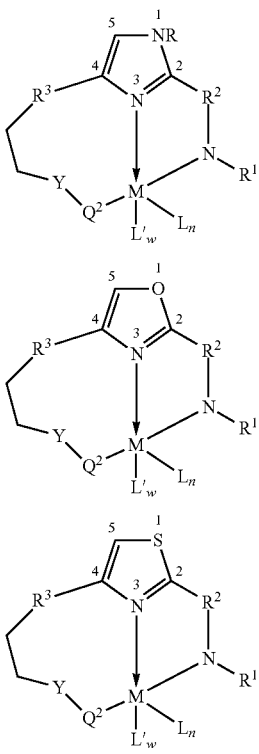

In any embodiment of the invention described herein, $G^1$ and $G^3$ are each a group 14 atom that are joined together by two or three additional group 14, 15, or 16 atoms to form a heterocycle or substituted heterocycle.

In a preferred embodiment, $Q^2$ is $CHR^{17}$, $CH_2$, or $C(R^{17})_2$ where $R^{17}$ is selected from hydrocarbyls (such as alkyls and aryls), substituted hydrocarbyls (such as heteroaryls), and silylcarbyl groups, preferably $R^{17}$ is a phenyl group or a substituted phenyl group optionally substituted with between one to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

In a preferred embodiment, $Q^2$ is $NR^{17}$, where $R^{17}$ is selected from hydrocarbyls (such as alkyls and aryls), substituted hydrocarbyls (such as heteroaryls), and silylcarbyl groups, preferably $R^{17}$ is a phenyl group or a substituted phenyl group optionally substituted with between one to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

In a preferred embodiment, $Q^2$ is O.
In a preferred embodiment, $Q^{2'}$ is N.
In a preferred embodiment, M is Zr or Hf, n is 2, and w is 0.
In a preferred embodiment, $Q^{2'}$ is CH or $CR^{17}$ where $R^{17}$ is selected from hydrocarbyls (such as alkyls and aryls), substituted hydrocarbyls (such as heteroaryls), and silylcarbyl groups, preferably $R^{17}$ is a phenyl group or a substituted phenyl group optionally substituted with between one to five substituents that include F, Cl, Br, I, $CF_3$, $NO_2$, dialkylamino, aryl, and alkyl groups having 1 to 10 carbons, such as methyl, ethyl, propyl, butyl, pentyl, hexyl, heptyl, octyl, nonyl, decyl, and isomers thereof.

In any embodiment of the invention described herein, each T may be independently selected from CH, C(hydrocarbyl), O, S, NH, N(hydrocarbyl), NMe, and NEt, where hydrocarbyl is preferably a $C_1$ to $C_{40}$ alkyl group, such as such as methyl, ethyl, propyl, butyl, pentyl, hexyl, heptyl, octyl, nonyl, decyl, or an isomer thereof.

In any embodiment of the invention described herein, E may be C, Si, or Ge.

In any embodiment of the invention described herein, Y may be $CH_2$, CH(Ph), CH(Me), CH(t-Bu), CH(i-Pr), C(O), C(N-iPr), C(Me), C(NEt), C(N-t-Bu), or C(NPh).

In any embodiment of the invention described herein, Y' may be CH, C(Ph), C(Me), C(t-Bu), C(Et), C(Pr), C(Bu), C(hexyl), or C(i-Pr).

In any embodiment of the invention described herein, $Q^2$ may be O, N(Ph), N(Mesityl), N(2,6-dimethylphenyl), N(2,6-diethylphenyl), N(2-methylphenyl), N(2-ethylphenyl), N(butyl), N(propyl), N(isopropyl), N(cyclohexyl), N(t-butyl), or N(2,6-diisopropylphenyl).

In any embodiment of the invention described herein, $Q^2$ may be $CH_2$, CHMe, CHEt, CHBu, CH(pentyl), CH(hexyl), CH(hexyl), CH(octyl), CH(nonyl), CH(decyl), or CHPh, O, N(Ph), N(Mesityl), N(2,6-dimethylphenyl), N(2,6-diethylphenyl), N(2-methylphenyl), N(2-ethylphenyl), N(butyl), N(propyl), N(isopropyl), N(cyclohexyl), N(t-butyl), or N(2,6-diisopropylphenyl).

In any embodiment of the invention described herein, $Q^{2'}$ may be N, P, CH, C(Ph), C(Me), C(t-Bu), or C(i-Pr).

In any embodiment of the invention described herein, preferably L is selected from halide, alkyl, aryl, alkoxy, amido, hydrido, phenoxy, hydroxy, silyl, allyl, alkenyl, alkylsulfonate, alkylcarboxylate, arylcarboxylate, and alkynyl, preferably benzyl, methyl, trimethylsilylmethyl, dimethylamide, diethylamide, fluoride, and chloride. The selection of the leaving groups depends on the synthesis route adopted for arriving at the complex and may be changed by additional reactions to suit the later activation method in polymerization. For example, a preferred L is alkyl when using non-coordinating anion activators such as N,N-dimethylanilinium tetrakis(pentafluorophenyl)-borate or tris (pentafluorophenyl)borane. In another embodiment, two L groups may be linked to form a dianionic leaving group, for example oxalate.

In any embodiment of the invention described herein, preferably L' is selected from ethers, thio-ethers, amines, nitriles, imines, pyridines, and phosphines, preferably ethers, preferably diethylether, dimethylsulfide, tetrahydrofuran and tetrahydrothiophene.

In any embodiment of the invention described herein, n is 1, 2, or 3 and w is 0, 1, 2, or 3, where n+w is no greater than 4, preferably n is 1 or 2 and w is 0 or 1, and n+w is 2. Alternately, n is 2, w is 0, and n+w is 2.

In any embodiment of the invention described herein, $R^1$ may be selected from the group consisting of alkyl, aryl, heteroaryl, and silyl groups, preferably $R^1$ is selected from phenyl groups that are variously substituted with between zero to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof. Some specific examples would include $R^1$ being chosen from a group including 2-methylphenyl, 2-isopropylphenyl, 2-ethylphenyl, 2,6-dimethylphenyl, mesityl, 2,6-diethylphenyl, 2,6-diisopropylphenyl, 2,4,6-triisopropylphenyl, 2-methyl-6-isopropylphenyl, and 2-ethyl-6-methylphenyl.

In any embodiment of the invention described herein, $R^2$ may be selected from moieties where E is carbon, especially a moiety —C($R^{12}$)($R^{13}$)— where $R^{12}$ is hydrogen and $R^{13}$ is an aryl group or a benzyl group (preferably a phenyl ring linked through an alkylene moiety such as methylene to the C atom). The phenyl group may then be substituted as discussed above for $R^1$. Useful $R^2$ groups include $CH_2$, $CMe_2$, $SiMe_2$, $SiEt_2$, $SiPr_2$, $SiBu_2$, $SiPh_2$, $Si(aryl)_2$, $Si(alkyl)_2$, CH(aryl), CH(Ph), CH(alkyl), CH(mesityl), and CH(2-isopropylphenyl). Particularly useful $R^2$ groups include $CH_2$, $CMe_2$, $SiMe_2$, $SiEt_2$, $SiPr_2$, $SiBu_2$, $SiPh_2$, $Si(aryl)_2$, and $Si(alkyl)_2$, CH(aryl), CH(Ph), CH(alkyl), CH(mesityl), and CH(2-isopropylphenyl), where alkyl is a $C_1$ to $C_{40}$ alkyl group, aryl is a $C_5$ to $C_{40}$ aryl group.

In some embodiments of the invention, $R^2$ is preferably CH(mesityl).

In any embodiment of the invention described herein, $R^2$ is represented by the formula:

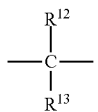

where $R^{12}$ is hydrogen, alkyl, aryl, or halogen; and $R^{13}$ is hydrogen, alkyl, aryl, or halogen.

In any embodiment of the invention described herein, $R^{12}$ and $R^{13}$ may be, independently, hydrogen, a $C_1$ to $C_{20}$ alkyl, preferably methyl, ethyl, propyl, butyl, pentyl, hexyl, heptyl, octyl, nonyl, decyl, undecyl, dodecyl, or an isomer thereof), or a $C_5$ to $C_{40}$ aryl group (preferably a $C_6$ to $C_{20}$ aryl group, preferably phenyl or substituted phenyl or an isomer thereof, preferably phenyl, 2-isopropylphenyl, or 2-tertbutylphenyl).

In any embodiment of the invention described herein, $R^3$ may be C or N.

In any embodiment of the invention described herein, $R^4$ and $R^5$ are C.

In any embodiment of the invention described herein, each J may be independently selected from C, CH, $CH_2$, $Si(R^{18})_2$, $SiH(R^{18})$, $NR^{18}$, O, or S, where $R^{18}$ is selected from hydrocarbyls, substituted hydrocarbyls, and silylcarbyls.

In any embodiment of the invention described herein, each x may be 3 or 4.

In any embodiment of the invention described herein, $R^1$ and $R^{17}$ each contain from 1 to 30 carbon atoms, preferably from 2 to 20 carbon atoms.

In any embodiment of the invention described herein, M may be Ti, Zr, or Hf, and E is carbon, with Zr or Hf based complexes being especially preferred.

In an alternate embodiment of the invention described herein, E is carbon and $R^1$ is selected from phenyl groups that are substituted with 0, 1, 2, 3, 4, or 5 substituents selected from the group consisting of F, Cl, Br, I, $CF_3$, $NO_2$, alkoxy, dialkylamino, hydrocarbyl, and substituted hydrocarbyls groups with from one to ten carbons.

In a preferred embodiment, $Q^{2'}$ is nitrogen and Y' is CH or C(hydrocarbyl), where the hydrocarbyl group contains 1 to 20 carbon atoms.

In a preferred embodiment, $Q^{2'}$ and Y' are each independently CH or C(hydrocarbyl), where each hydrocarbyl group contains 1 to 20 carbon atoms.

In a preferred embodiment, $Q^2$ is N(hydrocarbyl) and Y is $CH_2$ or CH(hydrocarbyl), where the hydrocarbyl groups are independently selected from groups that contain 1 to 20 carbon atoms.

In a preferred embodiment, $Q^2$ and Y are each independently $CH_2$ or CH(hydrocarbyl), where each hydrocarbyl groups contains 1 to 20 carbon atoms.

In a preferred embodiment, Y is selected from $CH_2$ or CH(hydrocarbyl), and $Q^2$ is not $CH_2$, CH(hydrocarbyl), or C(hydrocarbyl)$_2$, where the hydrocarbyl groups are independently selected from groups that contain 1 to 20 carbon atoms.

In a preferred embodiment, $Q^2$ is not $CH_2$, CH(hydrocarbyl), or C(hydrocarbyl)$_2$, where the hydrocarbyl groups are independently selected from groups that contain 1 to 20 carbon atoms.

In a preferred embodiment, M is zirconium, n is 2, w is 0, and $R^1$ is a 2,6-dialkylphenyl group containing between 8 and 20 carbons.

In a preferred embodiment, M is hafnium, n is 2, w is 0, and $R^1$ is a 2,6-dialkylphenyl group containing between 8 and 20 carbons.

In a preferred embodiment, M is zirconium, L is a hydrocarbyl group containing 1 to 6 carbons, n is 2, w is 0, and $R^1$ is a 2,6-dialkylphenyl group containing between 8 and 20 carbons.

In a preferred embodiment, M is hafnium, L is a hydrocarbyl group containing 1 to 6 carbons, n is 2, w is 0, and $R^1$ is a 2,6-dialkylphenyl group containing between 8 and 20 carbons.

In a preferred embodiment, M is zirconium, L is a hydrocarbyl group containing 1 to 6 carbons, n is 2, w is 0, and $Q^{2'}$ is nitrogen.

In a preferred embodiment, M is hafnium, L is a hydrocarbyl group containing 1 to 6 carbons, n is 2, w is 0, and $Q^{2'}$ is nitrogen.

Preferred pairing of $R^2$ and Y groups (expressed as $R^2$ & Y) includes: ($CH_2$ & CH(Ph)), ($CMe_2$ & CH(Ph)), ($CH_2$ & CH(aryl)), ($CH_2$ & CH(alkyl)), (CH(aryl) & CH(aryl)), (CH(aryl) & CH(alkyl)), (CH(mesityl) & CH(aryl)), and (CH(mesityl) & CH(alkyl)) where alkyl is a $C_1$ to $C_{40}$ alkyl group (preferably $C_1$ to $C_{20}$ alkyl, preferably one or more of methyl, ethyl, propyl, butyl, pentyl, hexyl, heptyl, octyl, nonyl, decyl, undecyl, dodecyl, and isomers thereof), aryl is a $C_5$ to $C_{40}$ aryl group (preferably a $C_6$ to $C_{20}$ aryl group, preferably phenyl or substituted phenyl, preferably phenyl, 2-isopropylphenyl, or 2-tertbutylphenyl).

Preferred pairing of $R^1$ and $R^2$ groups (expressed as $R^1$ & $R^2$) includes: (2,6-diisopropylphenyl & $CH_2$), (2,6-diisopropylphenyl & CH(mesityl)), (2,6-diisopropylphenyl & CHPh), (2,6-diisopropylphenyl & CH(aryl)), (2,6-disubstitutedphenyl & CH(aryl)), where alkyl is a $C_1$ to $C_{40}$ alkyl group (preferably $C_1$ to $C_{20}$ alkyl, preferably one or more of methyl, ethyl, propyl, butyl, pentyl, hexyl, heptyl, octyl, nonyl, decyl, undecyl, dodecyl, and isomers thereof), aryl is a $C_5$ to $C_{40}$ aryl group (preferably a $C_6$ to $C_{20}$ aryl group, preferably phenyl or substituted phenyl, preferably phenyl, 2-isopropylphenyl, or 2-tertbutylphenyl).

Preferred pairing of $R^1$ and $Q^2$ groups (expressed as $R^1$ & $Q^2$) includes: (2,6-di(alkyl)phenyl & N(alkyl)), where alkyl is a $C_1$ to $C_{40}$ alkyl group (preferably $C_1$ to $C_{20}$ alkyl, preferably one or more of methyl, ethyl, propyl, butyl, pentyl, hexyl, heptyl, octyl, nonyl, decyl, undecyl, dodecyl, and isomers thereof), aryl is a $C_5$ to $C_{40}$ aryl group (preferably a $C_6$ to $C_{20}$ aryl group, preferably phenyl or substituted phenyl, preferably phenyl, 2-isopropylphenyl, or 2-tertbutylphenyl).

Preferred pairing of $R^1$ and $Q^2$ groups (expressed as $R^1$ & $Q^2$) includes: (2,6-diisopropylphenyl & $CH_2$), (2,6-diisopropylphenyl & CH(alkyl)), (2,6-diisopropylphenyl & CHPh), (2,6-di(alkyl)phenyl & N(alkyl)), where alkyl is a $C_1$ to $C_{40}$ alkyl group (preferably $C_1$ to $C_{20}$ alkyl, preferably one or more of methyl, ethyl, propyl, butyl, pentyl, hexyl, heptyl, octyl, nonyl, decyl, undecyl, dodecyl, and isomers thereof), aryl is a $C_5$ to $C_{40}$ aryl group (preferably a $C_6$ to $C_{20}$ aryl group, preferably phenyl or substituted phenyl, preferably phenyl, 2-isopropylphenyl, or 2-tertbutylphenyl).

In another embodiment, $R^2$ is $CH_2$ or $CMe_2$ and Y is selected from the group consisting of CH(Ph), CH(aryl), CH(mesityl), and CH(alkyl), where alkyl is a $C_1$ to $C_{40}$ alkyl group (preferably $C_1$ to $C_{20}$ alkyl, preferably one or more of methyl, ethyl, propyl, butyl, pentyl, hexyl, heptyl, octyl, nonyl, decyl, undecyl, dodecyl, and isomers thereof), aryl is a $C_5$ to $C_{40}$ aryl group (preferably a $C_6$ to $C_{20}$ aryl group, preferably phenyl or substituted phenyl, preferably phenyl, 2-isopropylphenyl, or 2-tertbutylphenyl).

In any embodiment described herein, E is preferably carbon.

In a preferred embodiment, the heterocyclic amido transition metal complex is represented by the Formula (A), (B), (C), or (D) above, and M is a Group 4 metal preferably Zr or Hf, preferably Hf.

In a preferred embodiment, the heterocyclic amido transition metal complex is represented by the Formula (A), (B), (C) or (D) above, and in the $R^2$ group $R^{12}$ is H and $R^{13}$ is a group containing between 1 to 100 (preferably 6 to 40, preferably 6 to 30) carbons, M is a Group 4 metal (preferably Zr or Hf, preferably Hf), E is carbon, alternately in the $R^2$ group $R^{12}$ is the same as $R^{13}$ and is preferably hydrogen or methyl.

In a preferred embodiment, the heterocyclic amido transition metal complex is represented by the Formula (A), (B), (C) or (D) above, and both $R^{12}$ and $R^{13}$ in the $R^2$ group are a $C_1$ to $C_{100}$ alkyl group (preferably a $C_6$ to $C_{40}$ alkyl group, preferably $C_6$ to $C_{30}$ alkyl group, alternately a $C_1$ to $C_{12}$ alkyl group, alternately a $C_1$ to $C_6$ alkyl group, alternately methyl, ethyl, propyl, butyl, pentyl hexyl, octyl, nonyl, decyl, or an isomer thereof).

In another aspect of the invention there are provided various processes for synthesizing the complexes described herein.

Synthesis Methods

The complexes described herein may be prepared by reaction of molecules containing a reactive double or triple bond (shown as XY in the drawings below) with an appropriate transition metal complex (shown as intermediate A in the drawings below). Transition metal complexes useful for this process may be neutral or cationic and will have a metal-carbon bond that reacts with the double or triple bond of an unsaturated reactant to form the inventive complex via the formal insertion of the XY bond into the aforementioned metal-carbon bond. The product of such an insertion reaction will feature a new covalent bond between the transition metal center and at least one of the atoms of the XY group. Such reactions may be used to prepare the inventive complexes for isolation purposes. Alternatively, these reactions may be used to generate the inventive complexes in situ, which may be desirable for application in an olefin polymerization process. General examples of the insertion reaction are shown in the two equations below.

Insertion reaction involving XY molecule containing a reactive triple bond:

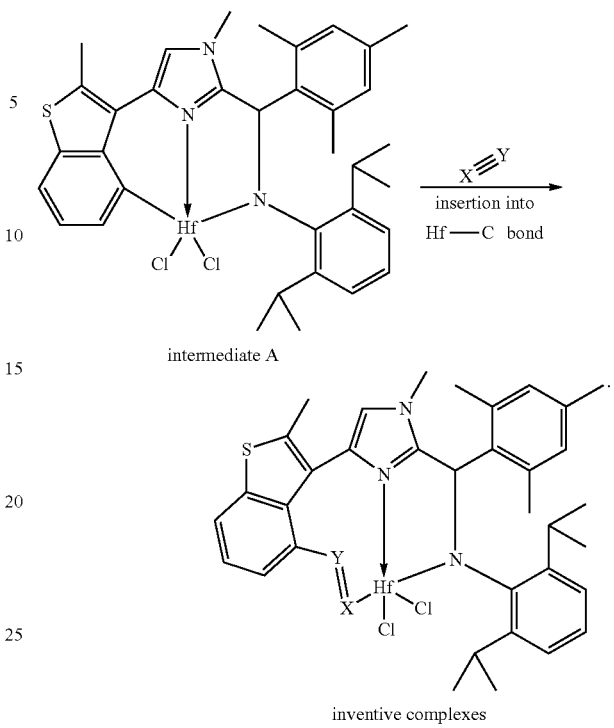

intermediate A inventive complexes

Insertion reaction involving XY molecule containing a reactive double bond:

intermediate A inventive complexes

In a useful embodiment the reactive XY molecule has a reactive CO double bond. Molecules of this type that may be suitable for this application include, but are not limited to, ketones, aldehydes, isocyanates, amides, formamides, esters, and carbon dioxide. When X is oxygen, the insertion products formed will typically have a new transition metal-oxygen bond. The Y group is usefully selected from a list that includes, but is not limited to, $CH_2$, CH(alkyl), CH(aryl), $C(alkyl)_2$, $C(aryl)_2$, C(alkyl)(aryl), C=N(alkyl), C=N(aryl), C(NH)(alkyl), C(NH)(aryl), C(alkyl)(alkoxy), C(alkyl)(aryloxy), C(aryl)(alkoxy), C(aryl)(aryloxy), and CO.

In another embodiment, the reactive XY molecule has a reactive CN double bond. Molecules of this type that may be suitable for this application include, but are not limited to, imines, formimines, and carbodiimides. The insertion products formed will typically have a new transition metal-nitrogen bond, so the X group is NH, N(alkyl), N(aryl), or another type of substituted nitrogen. The Y group is selected from a list that includes, but is not limited to, CH(alkyl), CH(aryl), $CH_2$, CN(alkyl), and CN(aryl).

In another embodiment, the reactive XY molecule has a reactive CN triple bond. Molecules of this type that may be suitable for this application include, but are not limited to, nitriles. The insertion products formed will typically have a new transition metal-nitrogen bond, so the X group is nitrogen. The Y group is selected from a list that includes, but is not limited to, CH, C(alkyl), and C(aryl).

In another embodiment, the reactive XY molecule has a reactive CC double bond. Molecules of this type that may be suitable for this application include, but are not limited to, ethylene, propylene, alpha olefins, internal olefins, allenes, diolefins, and styrene. The insertion products formed will typically have a new transition metal-carbon bond, so the X group is $CH_2$, CH(alkyl), CH(aryl), $C(alkyl)_2$, $C(aryl)_2$, C(alkyl)(aryl), or other disubstituted carbon, where alkyl is a $C_1$ to $C_{40}$ alkyl group (preferably $C_1$ to $C_{20}$ alkyl, preferably one or more of methyl, ethyl, propyl, butyl, pentyl, hexyl, heptyl, octyl, nonyl, decyl, undecyl, dodecyl, and isomers thereof), aryl is a $C_5$ to $C_{40}$ aryl group (preferably a $C_6$ to $C_{20}$ aryl group, preferably phenyl or substituted phenyl). The Y group is selected from a list that includes, but is not limited to, $CH_2$, CH(alkyl), CH(aryl), $C(alkyl)_2$, $C(aryl)_2$, C(alkyl)(aryl), and other disubstituted carbons, where alkyl is a $C_1$ to $C_{40}$ alkyl group (preferably $C_1$ to $C_{20}$ alkyl, preferably one or more of methyl, ethyl, propyl, butyl, pentyl, hexyl, heptyl, octyl, nonyl, decyl, undecyl, dodecyl, and isomers thereof), aryl is a $C_5$ to $C_{40}$ aryl group (preferably a $C_6$ to $C_{20}$ aryl group, preferably phenyl or substituted phenyl).

In another embodiment, the reactive XY molecule has a reactive CC triple bond. Molecules of this type that may be suitable for this application include, but are not limited to, acetylene, terminal alkynes, and internal alkynes. The insertion products formed will typically have a new transition metal-carbon bond, so the X group is CH, C(alkyl), or C(aryl) where alkyl is a $C_1$ to $C_{40}$ alkyl group (preferably $C_1$ to $C_{20}$ alkyl, preferably one or more of methyl, ethyl, propyl, butyl, pentyl, hexyl, heptyl, octyl, nonyl, decyl, undecyl, dodecyl, and isomers thereof), aryl is a $C_5$ to $C_{40}$ aryl group (preferably a $C_6$ to $C_{20}$ aryl group, preferably phenyl or substituted phenyl). The Y group is selected from a list that includes, but is not limited to, CH, C(alkyl), and C(aryl), where alkyl is a $C_1$ to $C_{40}$ alkyl group (preferably $C_1$ to $C_{20}$ alkyl, preferably one or more of methyl, ethyl, propyl, butyl, pentyl, hexyl, heptyl, octyl, nonyl, decyl, undecyl, dodecyl, and isomers thereof), aryl is a $C_5$ to $C_{40}$ aryl group (preferably a $C_6$ to $C_{20}$ aryl group, preferably phenyl or substituted phenyl).

In another embodiment, the inventive transition metal complex features a coordinated tridentate dianionic ligand that has a central neutral dative donor ($N^{dative}$) and a pair of anionic donor groups ($N^{anionic}$ and X) joined to the central dative donor group. The two rings formed by the chelation of the [$N^{anionic}$—$N^{dative}$—X] tridentate ligand to the transition metal center, ignoring any additional bonding to the Y group, have sizes of 5 and 8 atoms. These are shown in the drawing below. The 8-membered chelate ring is comprises the transition metal M, X, Y, $N^{dative}$, and the four additional atoms that form the shortest linkage between $N^{dative}$ and Y that excludes M. The 5-membered chelate ring comprises the transition metal M, $N^{dative}$, $N^{anionic}$, and two additional atoms that form the shortest linkage between $N^{dative}$ and $N^{anionic}$ that excludes M.

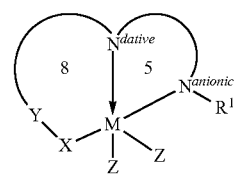

In another embodiment the inventive transition metal complex features a coordinated tridentate dianionic ligand like the one drawn below. Ring-A represents a 5 or 6 membered heterocyclic ring that has a nitrogen atom capable of forming a dative bond with the metal M. Examples of ring-A include, but are not limited to, derivatives of imidazole, N-alkylimidazole, thiazole, and oxazole. Ring-B and ring-C are each a 5 or 6-membered ring comprised of hydrogen, and group 14, 15, and/or 16 elements. The two chelate rings formed by the coordination of the [$N^{anionic}$—$N_{dative}$—X] tridentate ligand to the transition metal center, ignoring any additional bonding to the Y group, have sizes of 5 and 8 atoms. The 8-membered chelate ring comprises the transition metal M, X, Y, $N^{dative}$ and the four additional atoms that form the shortest linkage between $N^{dative}$ and Y that excludes M. The 5-membered chelate ring is comprised of the transition metal M, $N^{dative}$, $N^{anionic}$, and two additional atoms that form the shortest linkage between $N^{dative}$ and $N^{anionic}$ that excludes M.

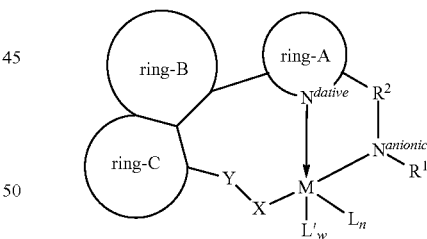

In another embodiment, the inventive complex is prepared by a route that does not involve the reaction of an intermediate transition metal complex (e.g., intermediate A) with a small molecule XY. Instead, the neutral multidentate ligand is pre-formed in a multistep organic synthesis. Then this preformed ligand may be complexed to the transition metal using known methods. For example, the "free-base" form of the multidentate ligand may be deprotonated using two equivalents of a strong base (e.g., butyllithium) to form a lithium salt of the ligand (i.e., $Li_2$[ligand]). This lithium salt may then be reacted with a transition metal halides, such as $HfCl_4$, $ZrCl_4$, $TiCl_4$, or $TiCl_3$ to form the desired complex (e.g., [ligand]$HfCl_2$, [ligand]$ZrCl_2$, [ligand]$TiCl_2$, or [ligand]TiCl) with the elimination of lithium chloride byproduct. Alternatively, the free-base ligand may be reacted with a basic transition metal reagent such as, $Hf(CH_2Ph)_4$, $Hf(CH_2Ph)_2Cl_2(OEt_2)$, $Zr(CH_2Ph)_4$, $Zr(CH_2Ph)_2Cl_2(OEt_2)$, $Zr(NMe_2)_4$, $Hf(NEt_2)_4$, or $Hf(NMe_2)_2Cl_2(1,2\text{-dimethoxy-ethane})$, to form the desired complex (e.g., [ligand]Hf $(CH_2Ph)_2$, [ligand]HfCl$_2$, [ligand]Zr(NMe$_2$)$_2$, [ligand] ZrCl$_2$) with the elimination of byproduct conjugate acid from the acid-base reaction.

Activators

After the complexes have been synthesized, catalyst systems may be formed by combining them with activators in any manner known from the literature, including by supporting them for use in slurry or gas phase polymerization. The catalyst systems may also be added to or generated in solution polymerization or bulk polymerization (in the monomer). The catalyst system typically comprises a complex as described above and an activator such as alumoxane or a non-coordinating anion. Activation may be performed using alumoxane solution including methyl alumoxane, referred to as MAO, as well as modified MAO, referred to herein as MMAO, containing some higher alkyl groups to improve the solubility. Particularly useful MAO can be purchased from Albemarle, typically in a 10 wt % solution in toluene. The catalyst system employed in the present invention preferably uses an activator selected from alumoxanes, such as methyl alumoxane, modified methyl alumoxane, ethyl alumoxane, iso-butyl alumoxane, and the like.

When an alumoxane or modified alumoxane is used, the complex-to-activator molar ratio is from about 1:3000 to 10:1; alternatively 1:2000 to 10:1; alternatively 1:1000 to 10:1; alternatively 1:500 to 1:1; alternatively 1:300 to 1:1; alternatively 1:200 to 1:1; alternatively 1:100 to 1:1; alternatively 1:50 to 1:1; alternatively 1:10 to 1:1. When the activator is an alumoxane (modified or unmodified), some embodiments select the maximum amount of activator at a 5000-fold molar excess over the catalyst precursor (per metal catalytic site). The preferred minimum activator-to-complex ratio is 1:1 molar ratio.

Activation may also be performed using non-coordinating anions, referred to as NCA's, of the type described in EP 277 003 A1 and EP 277 004 A1. NCA may be added in the form of an ion pair using, for example, [DMAH]+ [NCA]− in which the N,N-dimethylanilinium (DMAH) cation reacts with a basic leaving group on the transition metal complex to form a transition metal complex cation and [NCA]−. The cation in the precursor may, alternatively, be trityl. Alternatively, the transition metal complex may be reacted with a neutral NCA precursor, such as $B(C_6F_5)_3$, which abstracts an anionic group from the complex to form an activated species. Useful activators include N,N-dimethylanilinium tetrakis (pentafluorophenyl)borate (i.e., [PhNMe$_2$H]B(C$_6$F$_5$)$_4$) and N,N-dimethylanilinium tetrakis (heptafluoronaphthyl) borate, where Ph is phenyl, and Me is methyl.

Additionally, preferred activators useful herein include those described in U.S. Pat. No. 7,247,687 at column 169, line 50 to column 174, line 43, particularly column 172, line 24 to column 173, line 53.

Non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the noncoordinating anion. Suitable metals include, but are not limited to, aluminum, gold, and platinum. Suitable metalloids include, but are not limited to, boron, aluminum, phosphorus, and silicon. A stoichiometric activator can be either neutral or ionic. The terms ionic activator, and stoichiometric ionic activator can be used interchangeably. Likewise, the terms neutral stoichiometric activator, and Lewis acid activator can be used interchangeably. The term non-coordinating anion includes neutral stoichiometric activators, ionic stoichiometric activators, ionic activators, and Lewis acid activators.

In an embodiment of the invention described herein, the non-coordinating anion activator is represented by the following formula (1):

$$(Z)_d^+(A^{d-}) \quad (1)$$

wherein Z is (L-H) or a reducible Lewis acid; L is a neutral Lewis base; H is hydrogen and (L-H)$^+$ is a Bronsted acid; $A^{d-}$ is a non-coordinating anion having the charge d−; and d is an integer from 1 to 3.

When Z is (L-H) such that the cation component is (L-H)d+, the cation component may include Bronsted acids such as protonated Lewis bases capable of protonating a moiety, such as an alkyl or aryl, from the catalyst precursor, resulting in a cationic transition metal species, or the activating cation (L-H)d+ is a Bronsted acid, capable of donating a proton to the catalyst precursor resulting in a transition metal cation, including ammoniums, oxoniums, phosphoniums, silyliums, and mixtures thereof, or ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid, it may be represented by the formula: (Ar$_3$C+), where Ar is aryl or aryl substituted with a heteroatom, or a C$_1$ to C$_{40}$ hydrocarbyl, the reducible Lewis acid may be represented by the formula: (Ph$_3$C+), where Ph is phenyl or phenyl substituted with a heteroatom, and/or a C1 to C40 hydrocarbyl. In an embodiment, the reducible Lewis acid is triphenyl carbenium.

Embodiments of the anion component Ad− include those having the formula [Mk+Qn]d+ wherein k is 1, 2, or 3; n is 1, 2, 3, 4, 5 or 6, or 3, 4, 5 or 6; n−k=d; M is an element selected from Group 13 of the Periodic Table of the Elements, or boron or aluminum, and Q is independently a hydride, bridged or unbridged dialkylamido, halide, alkoxide, aryloxide, hydrocarbyl radicals, said Q having up to 20 carbon atoms with the proviso that in not more than one occurrence is Q a halide, and two Q groups may form a ring structure. Each Q may be a fluorinated hydrocarbyl radical having 1 to 20 carbon atoms, or each Q is a fluorinated aryl radical, or each Q is a pentafluoryl aryl radical. Examples of suitable Ad− components also include diboron compounds as disclosed in U.S. Pat. No. 5,447,895, which is fully incorporated herein by reference.

In an embodiment in any of the NCA's represented by Formula 1 described above, the anion component Ad− is represented by the formula [M*k*+Q*n*]d*− wherein k* is 1, 2, or 3; n* is 1, 2, 3, 4, 5, or 6 (or 1, 2, 3, or 4); n*−k*=d*; M* is boron; and Q* is independently selected from hydride, bridged or unbridged dialkylamido, halogen, alkoxide, aryloxide, hydrocarbyl radicals, said Q* having up to 20 carbon atoms with the proviso that in not more than 1 occurrence is Q* a halogen.

This invention also relates to a method to polymerize olefins comprising contacting olefins (such as propylene) with a catalyst complex as described above and an NCA activator represented by the Formula (2):

$$R_nM^{**}(ArNHal)_{4-n} \quad (2)$$

where R is a monoanionic ligand; M** is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA comprising an anion of Formula 2 also comprises a suitable cation that is essentially non-interfering with the ionic catalyst complexes formed with the transition metal compounds, or the cation is $Z_d^+$ as described above.

In an embodiment in any of the NCA's comprising an anion represented by Formula 2 described above, R is selected from the group consisting of $C_1$ to $C_{30}$ hydrocarbyl radicals. In an embodiment, $C_1$ to $C_{30}$ hydrocarbyl radicals may be substituted with one or more $C_1$ to $C_{20}$ hydrocarbyl radicals, halide, hydrocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means $C_4$ to $C_{20}$ hydrocarbyl radicals; —SRa, —NRa$_2$, and —PRa$_2$, where each $R^a$ is independently a monovalent $C_4$ to $C_{20}$ hydrocarbyl radical comprising a molecular volume greater than or equal to the molecular volume of an isopropyl substitution or a $C_4$ to $C_{20}$ hydrocarbyl substituted organometalloid having a molecular volume greater than or equal to the molecular volume of an isopropyl substitution.

In an embodiment in any of the NCA's comprising an anion represented by Formula 2 described above, the NCA also comprises cation comprising a reducible Lewis acid represented by the formula: $(Ar_3C+)$, where Ar is aryl or aryl substituted with a heteroatom, and/or a $C_1$ to $C_{40}$ hydrocarbyl, or the reducible Lewis acid represented by the formula: $(Ph_3C+)$, where Ph is phenyl or phenyl substituted with one or more heteroatoms, and/or $C_1$ to $C_{40}$ hydrocarbyls.

In an embodiment in any of the NCA's comprising an anion represented by Formula 2 described above, the NCA may also comprise a cation represented by the formula, (L-H)d+, wherein L is an neutral Lewis base; H is hydrogen; (L-H) is a Bronsted acid; and d is 1, 2, or 3, or (L-H)d+ is a Bronsted acid selected from ammoniums, oxoniums, phosphoniums, siliniums, and mixtures thereof.

Further examples of useful activators include those disclosed in U.S. Pat. No. 7,297,653 and U.S. Pat. No. 7,799,879, which are fully incorporated by reference herein.

In an embodiment, an activator useful herein comprises a salt of a cationic oxidizing agent and a non-coordinating, compatible anion represented by the Formula (3):

$$(OX^{e+})_d(A^{d-})_e \quad (3)$$

wherein $OX^{e+}$ is a cationic oxidizing agent having a charge of e+; e is 1, 2 or 3; d is 1, 2 or 3; and $A^{d-}$ is a non-coordinating anion having the charge of d− (as further described above). Examples of cationic oxidizing agents include: ferrocenium, hydrocarbyl-substituted ferrocenium, $Ag^+$, or $Pb^{+2}$. Suitable embodiments of $A^{d-}$ include tetrakis(pentafluorophenyl)borate.

Activators useful in catalyst systems herein include: trimethylammonium tetrakis(perfluoronaphthyl)borate, N,N-dimethylanilinium tetrakis(perfluoronaphthyl)borate, N,N-diethylanilinium tetrakis(perfluoronaphthyl)borate, triphenylcarbenium tetrakis(perfluoronaphthyl)borate, trimethylammonium tetrakis(perfluorobiphenyl)borate, N,N-dimethylanilinium tetrakis(perfluorobiphenyl)borate, triphenylcarbenium tetrakis(perfluorobiphenyl)borate, and the types disclosed in U.S. Pat. No. 7,297,653, which is fully incorporated by reference herein.

Suitable activators also include: N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Ph3C+][B(C6F5)4−], [Me3NH+][B(C6F5)4−]; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In an embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyeborate, triphenylcarbenium tetrakis(perfluorobiphenyeborate, triphenylcarbenium tetrakis(3,5-bis(trifluoromethyl)phenyl)borate).

In an embodiment, two NCA activators may be used in the polymerization and the molar ratio of the first NCA activator to the second NCA activator can be any ratio. In an embodiment, the molar ratio of the first NCA activator to the second NCA activator is 0.01:1 to 10,000:1, or 0.1:1 to 1000:1, or 1:1 to 100:1.

In an embodiment of the invention, the NCA activator-to-catalyst ratio is a 1:1 molar ratio, or 0.1:1 to 100:1, or 0.5:1 to 200:1, or 1:1 to 500:1 or 1:1 to 1000:1. In an embodiment, the NCA activator-to-catalyst ratio is 0.5:1 to 10:1, or 1:1 to 5:1.

In an embodiment, the catalyst compounds can be combined with combinations of alumoxanes and NCA's (see for example, U.S. Pat. No. 5,153,157; U.S. Pat. No. 5,453,410; EP 0 573 120 B1; WO 94/07928; and WO 95/14044 which discuss the use of an alumoxane in combination with an ionizing activator, all of which are incorporated by reference herein).

In a preferred embodiment of the invention, when an NCA (such as an ionic or neutral stoichiometric activator) is used, the complex-to-activator molar ratio is typically from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2.

Alternately, a co-activator or chain transfer agent, such as a group 1, 2, or 13 organometallic species (e.g., an alkyl aluminum compound such as tri-n-octyl aluminum), may also be used in the catalyst system herein. The complex-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1; 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

Chain Transfer Agents

A "chain transfer agent" is any agent capable of hydrocarbyl and/or polymeryl group exchange between a coordinative polymerization catalyst and the metal center of the chain transfer agent during a polymerization process. The chain transfer agent can be any desirable chemical compound such as those disclosed in WO 2007/130306. Preferably, the chain transfer agent is selected from Group 2, 12 or Group 13 alkyl or aryl compounds; preferably zinc, magnesium or aluminum alkyls or aryls; preferably where the alkyl is a $C_1$ to $C_{30}$ alkyl, alternately a $C_2$ to $C_{20}$ alkyl, alternately a $C_3$ to $C_{12}$ alkyl, typically selected independently from methyl, ethyl, propyl, butyl, isobutyl, tertbutyl, pentyl, hexyl, cyclohexyl, phenyl, octyl, nonyl, decyl, undecyl, and dodecyl; and where di-ethylzinc is particularly preferred.

In a particularly useful embodiment, this invention relates to a catalyst system comprising activator, catalyst complex as described herein and chain transfer agent wherein the chain transfer agent is selected from Group 2, 12, or Group 13 alkyl or aryl compounds.

In a particularly useful embodiment, the chain transfer agent is selected from dialkyl zinc compounds, where the alkyl is selected independently from methyl, ethyl, propyl, butyl, isobutyl, tertbutyl, pentyl, hexyl, cyclohexyl, and phenyl.

In a particularly useful embodiment, the chain transfer agent is selected from trialkyl aluminum compounds, where the alkyl is selected independently from methyl, ethyl, propyl, butyl, isobutyl, tertbutyl, pentyl, hexyl, cyclohexyl, and phenyl.

Useful chain transfer agents are typically present at from 10 or 20 or 50 or 100 equivalents to 600 or 700 or 800 or 1000 equivalents relative to the catalyst component. Alternately the chain transfer agent ("CTA") is preset at a catalyst complex-to-CTA molar ratio of from about 1:3000 to 10:1; alternatively 1:2000 to 10:1; alternatively 1:1000 to 10:1; alternatively, 1:500 to 1:1; alternatively 1:300 to 1:1; alternatively 1:200 to 1:1; alternatively 1:100 to 1:1; alternatively 1:50 to 1:1; alternatively 1:10 to 1:1.

Useful chain transfer agents include diethylzinc, tri-n-octyl aluminum, trimethylaluminum, triethylaluminum, triisobutylaluminum, tri-n-hexylaluminum, diethyl aluminum chloride, dibutyl zinc, di-n-propylzinc, di-n-hexylzinc, di-n-pentylzinc, di-n-decylzinc, di-n-dodecylzinc, di-n-tetradecylzinc, di-n-hexadecylzinc, di-n-octadecylzinc, diphenylzinc, diisobutylaluminum hydride, diethylaluminum hydride, di-n-octylaluminum hydride, dibutylmagnesium, diethylmagnesium, dihexylmagnesium, and triethylboron.

Supports

In some embodiments, the complexes described herein may be supported (with or without an activator) by any method effective to support other coordination catalyst systems, effective meaning that the catalyst so prepared can be used for oligomerizing or polymerizing olefin in a heterogeneous process. The catalyst precursor, activator, co-activator if needed, suitable solvent, and support may be added in any order or simultaneously. Typically, the complex and activator may be combined in solvent to form a solution. Then the support is added, and the mixture is stirred for 1 minute to 10 hours. The total solution volume may be greater than the pore volume of the support, but some embodiments limit the total solution volume below that needed to form a gel or slurry (about 90% to 400%, preferably about 100-200% of the pore volume). After stirring, the residual solvent is removed under vacuum, typically at ambient temperature and over 10-16 hours. But greater or lesser times and temperatures are possible.

The complex may also be supported absent the activator; in that case, the activator (and co-activator if needed) is added to a polymerization process's liquid phase. Additionally, two or more different complexes may be placed on the same support. Likewise, two or more activators or an activator and co-activator may be placed on the same support.

Suitable solid particle supports are typically comprised of polymeric or refractory oxide materials, each being preferably porous. Preferably any support material that has an average particle size greater than 10 µm is suitable for use in this invention. Various embodiments select a porous support material, such as for example, talc, inorganic oxides, inorganic chlorides, for example, magnesium chloride and resinous support materials such as polystyrene polyolefin or polymeric compounds or any other organic support material and the like. Some embodiments select inorganic oxide materials as the support material including Group -2, -3, -4, -5, -13, or -14 metal or metalloid oxides. Some embodiments select the catalyst support materials to include silica, alumina, silica-alumina, and their mixtures. Other inorganic oxides may serve either alone or in combination with the silica, alumina, or silica-alumina. These are magnesia, titania, zirconia, and the like. Lewis acidic materials such as montmorillonite and similar clays may also serve as a support. In this case, the support can optionally double as the activator component, however, an additional activator may also be used.

The support material may be pretreated by any number of methods. For example, inorganic oxides may be calcined, chemically treated with dehydroxylating agents such as aluminum alkyls and the like, or both.

As stated above, polymeric carriers will also be suitable in accordance with the invention, see for example the descriptions in WO 95/15815 and U.S. Pat. No. 5,427,991. The methods disclosed may be used with the catalyst complexes, activators or catalyst systems of this invention to adsorb or absorb them on the polymeric supports, particularly if made up of porous particles, or may be chemically bound through functional groups bound to or in the polymer chains.

Useful supports typically have a surface area of from 10-700 $m^2/g$, a pore volume of 0.1-4.0 cc/g and an average particle size of 10-500 µm. Some embodiments select a surface area of 50-500 $m^2/g$, a pore volume of 0.5-3.5 cc/g, or an average particle size of 20-200 µm. Other embodiments select a surface area of 100-400 $m^2/g$, a pore volume of 0.8-3.0 cc/g, and an average particle size of 30-100 µm. Useful supports typically have a pore size of 10-1000 Angstroms, alternatively 50-500 Angstroms, or 75-350 Angstroms.

The catalyst complexes described herein are generally deposited on the support at a loading level of 10-100 micromoles of complex per gram of solid support; alternately 20-80 micromoles of complex per gram of solid support; or 40-60 micromoles of complex per gram of support. But greater or lesser values may be used provided that the total amount of solid complex does not exceed the support's pore volume.

Polymerization

Inventive catalyst complexes are useful in polymerizing unsaturated monomers conventionally known to undergo metallocene-catalyzed polymerization such as solution, slurry, gas-phase, and high-pressure polymerization. Typically one or more of the complexes described herein, one or more activators, and one or more monomers are contacted to produce polymer. In certain embodiments, the complexes may be supported and as such will be particularly useful in the known, fixed-bed, moving-bed, fluid-bed, slurry, solution, or bulk operating modes conducted in single, series, or parallel reactors.

One or more reactors in series or in parallel may be used in the present invention. The complexes, activator and when required, co-activator, may be delivered as a solution or slurry, either separately to the reactor, activated in-line just prior to the reactor, or preactivated and pumped as an activated solution or slurry to the reactor. Polymerizations are carried out in either single reactor operation, in which monomer, comonomers, catalyst/activator/co-activator, optional scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to first reaction and another component to other reactors. In one preferred embodiment, the complex is activated in the reactor in the presence of olefin.

In a particularly preferred embodiment, the polymerization process is a continuous process.

Polymerization processes used herein typically comprise contacting one or more alkene monomers with the complexes (and, optionally, activator) described herein. For purpose of this invention alkenes are defined to include multi-alkenes (such as dialkenes) and alkenes having just one double bond. Polymerization may be homogeneous (solution or bulk polymerization) or heterogeneous (slurry-in-liquid diluent, or gas phase-in-gaseous diluent). In the case of heterogeneous slurry or gas phase polymerization, the complex and activator may be supported. Silica is useful as a support herein. Chain transfer agents (such as hydrogen, or diethyl zinc) may be used in the practice of this invention.

The present polymerization processes may be conducted under conditions preferably including a temperature of about 30° C. to about 200° C., preferably from 60° C. to 195° C., preferably from 75° C. to 190° C. The process may be conducted at a pressure of from 0.05 MPa to 1500 MPa. In a preferred embodiment, the pressure is between 1.7 MPa and 30 MPa, or in another embodiment, especially under supercritical conditions, the pressure is between 15 MPa and 1500 MPa.

Monomers

Monomers useful herein include olefins having from 2 to 20 carbon atoms, alternately 2 to 12 carbon atoms (preferably ethylene, propylene, butylene, pentene, hexene, heptene, octene, nonene, decene, and dodecene) and optionally also polyenes (such as dienes). Particularly preferred monomers include ethylene, and mixtures of $C_2$ to $C_{10}$ alpha olefins, such as ethylene-propylene, ethylene-hexene, ethylene-octene, propylene-hexene, and the like.

The complexes described herein are also particularly effective for the polymerization of ethylene, either alone or in combination with at least one other olefinically unsaturated monomer, such as a $C_3$ to $C_{20}$ α-olefin, and particularly a $C_3$ to $C_{12}$ α-olefin. Likewise, the present complexes are also particularly effective for the polymerization of propylene, either alone or in combination with at least one other olefinic ally unsaturated monomer, such as ethylene or a $C_4$ to $C_{20}$ α-olefin, and particularly a $C_4$ to $C_{20}$ α-olefin. Examples of preferred α-olefins include ethylene, propylene, butene-1, pentene-1, hexene-1, heptene-1, octene-1, nonene-1, decene-1, dodecene-1, 4-methylpentene-1, 3-methylpentene-1,3,5,5-trimethylhexene-1, and 5-ethyl-nonene-1.

In some embodiments, the monomer mixture may also comprise one or more dienes at up to 10 wt %, such as from 0.00001 to 1.0 wt %, for example from 0.002 to 0.5 wt %, such as from 0.003 to 0.2 wt %, based upon the monomer mixture. Non-limiting examples of useful dienes include, cyclopentadiene, norbornadiene, dicyclopentadiene, 5-ethylidene-2-norbornene, 5-vinyl-2-norbornene, 1,4-hexadiene, 1,5-hexadiene, 1,5-heptadiene, 1,6-heptadiene, 6-methyl-1,6-heptadiene, 1,7-octadiene, 7-methyl-1,7-octadiene, 1,9-decadiene, land 9-methyl-1,9-decadiene.

Where olefins are used that give rise to short chain branching, such as propylene, the catalyst systems may, under appropriate conditions, generate stereoregular polymers or polymers having stereoregular sequences in the polymer chains.

Scavengers

In some embodiments, when using the complexes described herein, particularly when they are immobilized on a support, the catalyst system will additionally comprise one or more scavenging compounds. Here, the term scavenging compound means a compound that removes polar impurities from the reaction environment. These impurities adversely affect catalyst activity and stability. Typically, the scavenging compound will be an organometallic compound such as the Group-13 organometallic compounds of U.S. Pat. No. 5,153,157; U.S. Pat. No. 5,241,025; WO-A-91/09882; WO-A-94/03506; WO-A-93/14132; and that of WO 95/07941. Exemplary compounds include triethyl aluminum, triethyl borane, tri-iso-butyl aluminum, methyl alumoxane, iso-butyl alumoxane, and tri-n-octyl aluminum. Those scavenging compounds having bulky or $C_6$-$C_{20}$ linear hydrocarbyl substituents connected to the metal or metalloid center usually minimize adverse interaction with the active catalyst. Examples include triethylaluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, $[Me_2HNPh]^+[B(pfp)_4]^-$ or $B(pfp)_3$ (perfluorophenyl=pfp=$C_6F_5$).

In a preferred embodiment, two or more complexes are combined with diethyl zinc in the same reactor with monomer. Alternately, one or more complexes is combined with another catalyst (such as a metallocene) and a chain transfer agent, such as diethyl zinc and or tri-n-octyl aluminum, in the same reactor with monomer.

The chain transfer agent may be the same as or different from the scavenger.

Polymer Products

While the molecular weight of the polymers produced herein is influenced by reactor conditions including temperature, monomer concentration and pressure, the presence of chain terminating agents and the like, the homopolymer and copolymer products produced by the present process may have an Mw of about 1,000 to about 2,000,000 g/mol, alternately of about 30,000 to about 600,000 g/mol, or alternately of about 100,000 to about 500,000 g/mol, as determined by GPC. Preferred polymers produced here may be homopolymers or copolymers. In a preferred embodiment, the comonomer(s) are present at up to 50 mol %, preferably from 0.01 to 40 mol %, preferably 1 to 30 mol %, preferably from 5 to 20 mol %.

In some embodiments herein, a multimodal polyolefin composition is produced, comprising a first polyolefin component and at least another polyolefin component, different from the first polyolefin component by molecular weight, preferably such that the GPC trace has more than one peak or inflection point.

The term "multimodal," when used to describe a polymer or polymer composition, means "multimodal molecular weight distribution," which is understood to mean that the Gel Permeation Chromatography (GPC) trace, plotted as Absorbance versus Retention Time (seconds), has more than one peak or inflection points. An "inflection point" is that point where the second derivative of the curve changes in sign (e.g., from negative to positive or vice versa). For example, a polyolefin composition that includes a first lower molecular weight polymer component (such as a polymer having an Mw of 100,000 g/mol) and a second higher molecular weight polymer component (such as a polymer having an Mw of 300,000 g/mol) is considered to be a "bimodal" polyolefin composition. Preferably, the Mw's of the polymer or polymer composition differ by at least 10%, relative to each other, preferably by at least 20%, preferably at least 50%, preferably by at least 100%, preferably by a least 200%. Likewise, in a preferred embodiment, the Mw's of the polymer or polymer composition differ by 10% to 10,000%, relative to each other, preferably by 20% to 1000%, preferably 50% to 500%, preferably by at least 100% to 400%, preferably 200% to 300%.

Unless otherwise indicated, measurements of weight average molecular weight (Mw), number average molecular weight (Mn), and z average molecular weight (Mz) are determined by Gel Permeation Chromatography (GPC) as described in Macromolecules, 2001, Vol. 34, No. 19, pg. 6812, which is fully incorporated herein by reference, including that, a High Temperature Size Exclusion Chromatograph (SEC, Waters Alliance 2000), equipped with a differential refractive index detector (DRI) equipped with three Polymer Laboratories PLgel 10 mm Mixed-B columns is used. The instrument is operated with a flow rate of 1.0 cm3/min, and an injection volume of 300 μL. The various transfer lines, columns and differential refractometer (the DRI detector) are housed in an oven maintained at 145 C. Polymer solutions are prepared by heating 0.75 to 1.5 mg/mL of polymer in filtered 1,2,4-Trichlorobenzene (TCB) containing ~1000 ppm of butylated hydroxy toluene (BHT) at 160° C. for 2 hours with continuous agitation. A sample of the polymer containing solution is injected into to the GPC and eluted using filtered 1,2,4-trichlorobenzene (TCB) containing ~1000 ppm of BHT. The separation efficiency of the column set is calibrated using a series of narrow MWD polystyrene standards reflecting the expected Mw range of the sample being analyzed and the exclusion limits of the column set. Seventeen individual polystyrene standards, obtained from Polymer Laboratories (Amherst, Mass.) and ranging from Peak Molecular Weight (Mp) ~580 to 10,000,000, were used to generate the calibration curve. The flow rate is calibrated for each run to give a common peak position for a flow rate marker (taken to be the positive inject peak) before determining the retention volume for each polystyrene standard. The flow marker peak position is used to correct the flow rate when analyzing samples. A calibration curve (log(Mp) vs. retention volume) is generated by recording the retention volume at the peak in the DRI signal for each PS standard, and fitting this data set to a 2nd-order polynomial. The equivalent polyethylene molecular weights are determined by using the Mark-Houwink coefficients shown in Table B.

TABLE B

| Mark-Houwink coefficients | | |
|---|---|---|
| Material | K (dL/g) | α |
| PS | $1.75 \times 10^{-4}$ | 0.67 |
| PE | $5.79 \times 10^{-4}$ | 0.695 |

In a preferred embodiment, the homopolymer and copolymer products produced by the present process may have an Mw of about 1,000 to about 2,000,000 g/mol, alternately of about 30,000 to about 600,000 g/mol, or alternately of about 100,000 to about 500,000 g/mol, as determined by GPC and have a multi-modal, preferably bimodal, Mw/Mn.

End Uses

Articles made using polymers produced herein may include, for example, molded articles (such as containers and bottles, e.g., household containers, industrial chemical containers, personal care bottles, medical containers, fuel tanks, and storage ware, toys, sheets, pipes, tubing) films, non-wovens, and the like. It should be appreciated that the list of applications above is merely exemplary, and is not intended to be limiting.

EXPERIMENTAL $^1$H NMR spectroscopic data were acquired at 250, 400, or 500 MHz using solutions prepared by dissolving approximately 10 mg of a sample in approximately 0.75 mL of either $C_6D_6$, $CD_2Cl_2$, $CDCl_3$, or $D_8$-toluene. The chemical shifts (δ) presented are relative to the residual protium in the deuterated solvent at 7.15, 5.32, 7.24, and 2.09 for $C_6D_6$, $CD_2Cl_2$, $CDCl_3$, and $D_8$-toluene, respectively. For purposes of the claims 500 Mz and $CD_2Cl_2$ are used.

EXAMPLES

Complexes 1-5 have been prepared by reaction of intermediate A with small molecules containing reactive double or triple bonds. Dashed bonds to the metal center indicate an optional, dative bond.

$HfBn_2Cl_2(Et_2O)$ was prepared by reaction of one equivalent of $HfBn_4$ (Strem) with $HfCl_4$ (Strem) in ether for 5 hours followed by filtration and crystallization of the product. (2,6-Diisopropylphenyl){mesityl[1-methyl-4-(2-methyl-1-benzothien-3-yl)-1H-imidazol-2-yl]methyl}amine ($LH_2$) was prepared as described in [Diamond, G. M.; Hall, K. A.; LaPointe, A. M.; Leclerc, M. K.; Longmire, J.; Shoemaker, J. A. W.; Sun, P. U.S. Pat. No. 7,256,296 for Symyx Technologies, Inc.; Diamond, G. M.; Hall, K. A.; LaPointe, A. M.; Leclerc, M. K.; Longmire, J.; Shoemaker, J. A. W.; Sun, P. ACS Catalysis 2011, 1, 887.]. Benzene (Merck) and hexane (Merck) were dried over and kept on over molecular sieves 4A. Dichloromethane (and $CD_2Cl_2$ for NMR measurements) was distilled over $P_4O_{10}$ and kept on molecular sieves 4A. Acetone (Merck), diisopropilcarbodiimide (Aldrich), dicyclohexylcarbodiimide (Aldrich), phenylisocyanate (Aldrich) and isobutyronitrile (Aldrich) were used as received.

Intermediate A

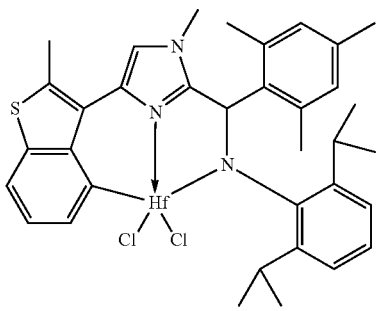

A mixture of (2,6-diisopropylphenyl){mesityl[1-methyl-4-(2-methyl-1-benzothien-3-yl)-1H-imidazol-2-yl]methyl}amine (LH$_2$) (1.06 g, 1.98 mmol) and HfCl$_2$Bn$_2$(Et$_2$O) (1.0 g, 1.98 mmol) was dissolved in 300 ml of benzene, the formed solution was stirred for 3 days in a pressure bottle at 80° C. Then solvent was evaporated, and the residue was washed with hexane (20 ml) and dichloromethane (2×10 ml). Yield 850 mg (55%) of Intermediate A as white solid.

Anal. calc. for C$_{35}$H$_{39}$Cl$_2$HfN$_3$S: C, 53.68; H, 5.02; N, 5.37. Found: C, 53.79; H, 5.29; N, 5.22.

$^1$H NMR (CD$_2$Cl$_2$): δ 8.45 (m, 1H, 7-H in benzothiophene), 7.80 (m, 1H, 5-H in benzothiophene), 7.34 (m, 1H, 6-H in benzothiophene), 7.34 (s, 1H, 5-H in imidazole), 7.20 (m, 2H, 3,5-H in 2,6-diisopropylphenyl), 6.97 (m, 1H, 4-H in in 2,6-diisopropylphenyl), 6.80 (m, 1H, 3-H in mesityl), 6.67 (m, 1H, 5-H in mesityl), 6.13 (s, 1H, mesityl-CH), 3.22 (m, 1H, CHMe$_2$), 3.21 (s, 3H, NMe in imidazole), 3.20 (m, 1H, CHMe$_2$), 2.79 (s, 3H, 2-Me in benzotiophene), 2.18 (s, 3H, 2-Me in mesityl), 2.00 (s, 3H, 6-Me in mesityl), 1.57 (s, 3H, 4-Me in mesityl), 1.39 (d, J=6.65 Hz, 3H, CHMeMe'), 1.34 (d, J=6.85 Hz, 3H, CHMeMe'), 1.15 (d, J=6.65 Hz, 3H, CHMeMe'), 0.10 (d, J=6.65 Hz, 3H, CHMeMe').

Example 1. Synthesis of Complex 1 (Cat ID=1)

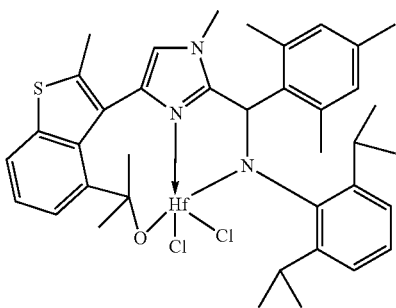

A mixture of 200 mg (0.255 mmol) of Intermediate A and 15 mg (0.258 mmol) of acetone in 15 ml of dichloromethane was stirred for 5 min at room temperature. Further on, the solvent was evaporated, and the residue was washed with 2×15 ml of hexane and dried in vacuum. This procedure gave 185 mg (86%) of Complex 1 as a white solid.

Anal. calc. for C$_{38}$H$_{45}$Cl$_2$HfN$_3$OS: C, 54.25; H, 5.39; N, 4.99. Found: C, 54.40; H, 5.61; N, 4.75.

$^1$H NMR (CD$_2$Cl$_2$): δ 7.77 (m, 1H, 7-H in benzothiophene), 7.48 (m, 1H, 5-H in benzothiophene), 7.27, (m, 1H, 6-H in benzothiophene), 7.15 (m, 2H, 3,5-H in 2,6-diisopropylphenyl), 6.92 (m, 1H, 4-H in 2,6-diisopropylphenyl), 6.86 (s, 1H, 5-H in imidazole), 6.81 (m, 1H, 3-H in mesityl), 6.64 (m, 1H, 5-H in mesityl), 5.96 (s, 1H, mesityl-CH), 3.47 (m, 1H, CHMe$_2$), 3.21 (m, 1H, CHMe$_2$), 3.14 (s, 3H, NMe in imidazole), 2.50 (s, 3H, 2-Me in benzotiophene), 2.19 (s, 3H, MeMe'C—O), 2.18 (s, 3H, MeMe'C—O), 1.85 (s, 3H, 2-Me in mesityl), 1.58 (s, 3H, 6-Me in mesityl), 1.48 (d, J=6.83 Hz, 6H, two CHMeMe'), 1.47 (s, J=6.24 Hz, 3H, 4-Me in mesityl), 1.12 (d, 3H, J=6.83 Hz, CHMeMe'), 0.10 (d, J=6.83 Hz, 3H, CHMeMe').

$^{13}$C{$^1$H} NMR (CD$_2$Cl$_2$): δ 155.50, 147.99, 147.53, 144.80, 143.85, 142.88, 141.56, 140.46, 139.03, 138.66, 136.74, 135.51, 132.35, 131.08, 130.03, 126.10, 124.13, 123.80, 123.68, 123.44, 122.97, 122.53, 84.76, 66.41, 33.59, 33.35, 31.19, 28.86, 28.25, 26.98, 25.65, 25.08, 22.53, 21.29, 20.76, 20.55, 16.83.

Example 2. Synthesis of Complex 2 (Cat ID=2)

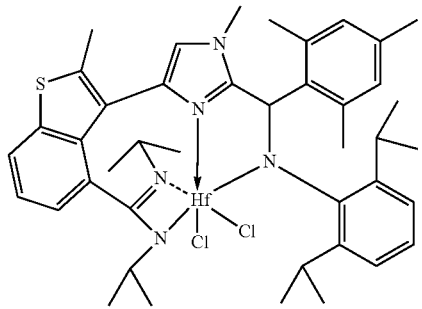

A mixture of 200 mg (0.255 mmol) of Intermediate A and 33 mg (0.261 mmol) of diisopropylcarbodiimide in 15 ml of in dichloromethane was stirred for 5 min at room temperature. Further on, the solvent was evaporated, and the residue was washed with 2×15 ml of hexane and dried in vacuum. This procedure gave 206 mg (89%) of Complex 2 as white solid.

Anal. calc. for C$_{42}$H$_{53}$Cl$_2$HfN$_5$S: C, 55.47; H, 5.87, N, 7.70. Found: C, 55.39; H, 6.06; N, 7.50.

$^1$H NMR (CD$_2$Cl$_2$): δ 7.81 (m, 1H, 7-H in benzothiophene), 7.38 (m, 1H, 5-H in benzothiophene), 7.24 (m, 2H, 3-H in 2,6-diisopropylphenyl), 7.13 (m, 1H, 6-H in benzithiophene), 6.90 (m, 1H, 4-H in 2,6-diisopropylphenyl), 6.76 (m, 1H, 3-H in mesityl), 6.69 (m, 1H, 5-H in imidazole), 6.57 (s, 1H, 3-H in mesityl), 6.09 (s, 1H, mesityl-CH), 4.12 (m, 1H, CHMe$_2$), 3.97 (m, 1H, Me$_2$CH—N), 3.57 (m, 1H, CHMe$_2$), 2.89 (s, 3H, NMe in imidazole), 2.63 (s, 3H, 2-Me in benzotiophene), 2.42 (m, 1H, Me$_2$CH—N) 2.17, (s, 3H, 2-Me in mesityl), 2.15 (s, 3H, 6-Me in mesityl), 1.45 (d, J=6.60 Hz, 3H, CHMeMe'), 1.43 (d, J=6.61 Hz, 3H, CHMeMe'), 1.42 (s, 3H, 4-Me in mesityl), 1.25 (d, J=6.61 Hz, 3H, N—CHMeMe'), 1.10 (d, J=6.97 Hz, 3H, CHMeMe'), 1.08 (d, J=6.60 Hz, 3H, N—CHMeMe'), 0.65 (d, J=6.24 Hz, 3H, N—CHMeMe'), 0.59 (d, 3H, J=6.60 Hz, N—CHMeMe'), 0.03 (d, J=6.97 Hz, 3H, CHMeMe').

$^{13}$C{$^1$H} NMR (CD$_2$Cl$_2$): δ 174.81, 159.68, 149.43, 149.11, 145.32, 143.06, 139.95, 139.81, 138.73, 138.22, 137.37, 133.15, 132.99, 132.72, 129.71, 129.39, 126.89, 125.81, 125.57, 124.97, 123.97, 123.87, 122.76, 122.72, 65.14, 52.15, 50.76, 33.61, 29.16, 28.35, 28.09, 26.49, 26.10, 25.52, 25.26, 22.28, 22.03, 21.33, 20.89, 20.70, 17.35, 14.29.

Example 3. Synthesis of Complex 3 (Cat ID=3)

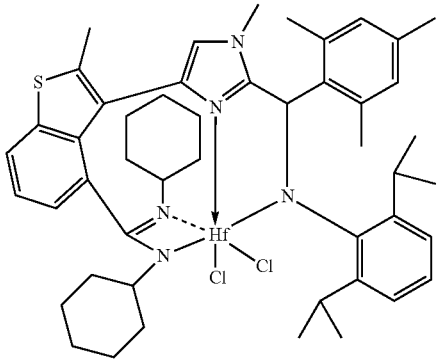

A mixture of 200 mg (0.255 mmol) of Intermediate A and 53 mg (0.257 mmol) dicyclohexylcarbodiimide in 15 ml of in dichloromethane was stirred for 5 min at room temperature. Further on, the solvent was evaporated, and the residue was washed with 2×15 ml of hexane and dried in vacuum. This procedure gave 214 mg (85%) of Complex 3 as a white solid.

Anal. calc. for $C_{48}H_{61}Cl_2HfN_5S$: C, 58.26; H, 6.21; N, 7.08. Found: C, 58.43; H, 6.39; N, 6.85.

$^1$H NMR ($CD_2Cl_2$): δ 7.81 (m, 1H, 7-H in benzothiophene), 7.38 (m, 1H, 6-H in benzothiophene), 7.22, (m, 2H, 3,5-H in 2,6-diisopropylphenyl), 7.12 (m, 1H, 5-H in benzothiophene), 6.89 (m, 1H, 4-H in 2,6-diisopropylphenyl), 6.76 (m, 1H, 3-H in mesityl), 6.66 (s, 1H, 5-H in imidazole), 6.56 (s, 1H, 3-H in mesityl), 6.08 (s, 1H, mesityl-CH), 3.93 (m, 1H, CHMe$_2$), 3.67 (m, 1H, 1-H in cyclohexyl), 3.56 (m, 1H, CHMe$_2$), 2.90 (s, 3H, NMe in imidazole), 2.60 (s, 3H, 2-Me in benzotiophene), 2.15, (s, 3H, 2-Me in mesityl), 2.14 (s, 3H, 6-Me in mesityl), 1.98 (m, 1H, 1-H in cyclohexyl), 1.88 (m, 2H, cyclohexyl), 1.52-1.70 (m, 5H, cyclohexyl), 1.48 (d, J=6.84 Hz, 3H, CHMeMe'), 1.45 (d, J=7.04 Hz, 3H, CHMeMe'), 1.44 (s, 3H, 4-Me in mesityl), 1.12-1.39 (m, 6H, cyclohexyl), 1.07 (d, J=6.46 Hz, 3H, CHMeMe'), 0.63-1.02 (m, 5H, cyclohexyl), 0.43 (m, 1H, cyclohexyl), 0.30 (m, 1H, cyclohexyl), 0.01 (d, J=6.84 Hz, 3H, CHMeMe').

Example 4. Synthesis of Complex 4 (Cat ID=4)

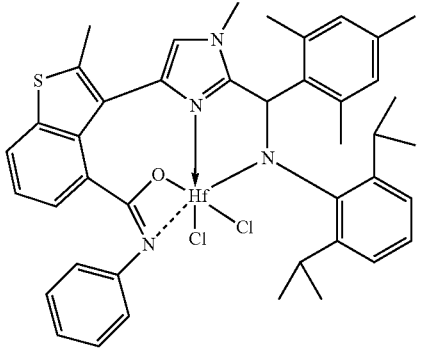

A mixture of 200 mg (0.255 mmol) of Intermediate A and 31 mg (0.260 mmol) of phenylisocyanate in 15 ml of in dichloromethane was stirred for 5 min at room temperature. Further on, the solvent was evaporated, and the residue was washed with 2×15 ml of hexane and dried in vacuum. This procedure gave 180 mg (78%) of Complex 4 as a white solid.

Anal. calc. for $C_{42}H_{44}Cl_2HfN_4OS$: C, 55.91; H, 4.92; N, 6.21. Found: C, 56.24; H, 5.17; N, 6.08.

$^1$H NMR ($CD_2Cl_2$): δ 7.72 (m, 1H, 7-H in benzothiophene), 7.24 (m, 2H, 5,6-H in benzothiophene), 7.11-7.17 (m, 3H, 2,4,6-H in Ph-N=C), 7.04-7.07 (m, 2H, 3,5-H in 2,6-diisopropylphenyl), 6.92 (m, 1H, 4-H in 2,6-diisopropylphenyl), 6.86, (m, 1H, 5-H in imidazole), 6.83 (m, 1H, 3-H in mesityl), 6.60 (m, 1H, 5-H in mesityl), 6.48 (m, 2H, 3,5-H in Ph-N=C), 6.08 (s, 1H, mesityl-CH), 3.45 (m, 1H, CHMe$_2$), 3.07 (s, 3H, NMe in imidazole), 3.02 (m, 1H, CHMe$_2$), 2.72 (s, 3H, 2-Me in benzotiophene), 2.21 (s, 3H, 2-Me in mesityl), 2.17 (s, 3H, 6-Me in mesityl), 1.43 (s, 3H, 4-Me in mesityl), 1.16 (d, J=6.65 Hz, 3H, CHMeMe'), 0.89 (d, J=6.85 Hz, 3H, CHMeMe'), 0.74 (d, J=6.65 Hz, 3H, CHMeMe'), 0.09 (d, J=6.65 Hz, 3H, CHMeMe').

$^{13}$C{$^1$H} NMR ($CD_2C_2$): δ 179.47, 159.09, 148.52, 146.06, 145.49, 144.93, 144.15, 139.43, 139.36, 138.80, 138.44, 138.28, 132.90, 132.66, 131.64, 130.01, 129.26, 126.96, 126.73, 126.14, 124.97, 124.89, 124.00, 123.94, 123.80, 123.55, 122.25, 65.50, 34.07, 28.34, 28.30, 27.53, 25.82, 25.14, 24.84, 22.22, 21.39, 20.72, 17.04.

Example 5. Synthesis of Complex 5 (Cat ID=5)

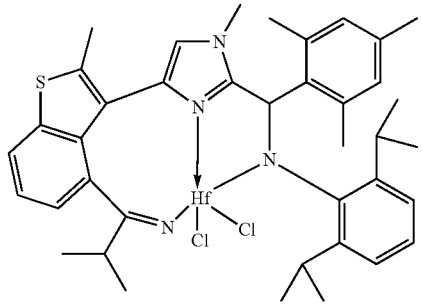

A mixture of 200 mg (0.255 mmol) of Intermediate A and 18 mg (0.261 mmol) of isobutyronitrile in 15 ml of in dichloromethane was stirred for 5 min at room temperature. Further on, the solvent was evaporated, and the residue was washed with 2×15 ml of hexane and dried in vacuum. This procedure gave 163 mg (75%) of Complex 5 as a white solid.

Anal. calc. for $C_{39}H_{46}Cl_2HfN_4S$: C, 54.96; H, 5.44; N, 6.57. Found: C, 55.25; H, 5.30; N, 6.43.

$^1$H NMR ($CD_2Cl_2$): δ 7.79 (m, 1H, 5-H in benzothiophene), 7.37 (m, 1H, 7-H in benzothiophene), 7.30 (m, 1H, 6-H in benzothiophene), 7.13-7.21 (m, 2H, 3,5-H in 2,6-diisopropylphenyl), 6.92 (m, 1H, 4-H in 2,6-diisopropylphenyl), 6.77 (m, 1H, 3-H in mesityl), 6.76 (s, 1H, 5-H in imidazole), 6.61 (s, 1H, 3-H in mesityl), 6.05 (s, 1H, mesityl-CH), 3.80 (m, 1H, N=CCHMe$_2$), 3.37 (m, 1H, CHMe$_2$), 3.21 (m, 1H, CHMe$_2$), 3.10 (s, 3H, NMe in imidazole), 2.42 (s, 3H, 2-Me in benzotiophene), 2.16, (s, 3H, 2-Me in mesityl), 2.09 (s, 3H, 6-Me in mesityl), 1.65 (s, 3H, 4-Me in mesityl), 1.50 (d, J=6.88 Hz, 3H, CHMeMe'), 1.40 (d, J=6.69 Hz, 3H, CHMeMe'), 1.22 (d, J=6.48 Hz, 3H, N=CCHMeMe'), 1.13 (d, J=6.69 Hz, 3H, CHMeMe'), 0.83 (d, J=6.89 Hz, 3H, N=CCHMeMe'), 0.18 (d, J=6.69 Hz, 3H, CHMeMe').

$^{13}C\{^1H\}$ NMR (CD$_2$Cl$_2$): δ 183.34, 157.61, 148.49, 146.11, 145.91, 143.52, 142.15, 139.50, 139.01, 138.92, 138.45, 136.96, 132.81, 132.57, 131.28, 129.86, 126.51, 124.80, 123.86, 123.59, 123.49, 123.37, 122.96, 122.51, 65.96, 39.30, 33.51, 28.70, 28.07, 26.72, 26.61, 25.41, 22.35, 21.80, 20.71, 20.55, 20.28, 20.11, 15.84.

Polymerization Examples

Solutions of the pre-catalysts (Complexes 1 through 5, prepared above) were made using toluene (ExxonMobil Chemical—anhydrous, stored under N$_2$) (98%). Pre-catalyst solutions were typically 0.5 mmol/L. Solvents, polymerization grade toluene and/or isohexanes were supplied by ExxonMobil Chemical Co. and are purified by passing through a series of columns: two 500 cc Oxyclear cylinders in series from Labclear (Oakland, Calif.), followed by two 500 cc columns in series packed with dried 3 Å mole sieves (8-12 mesh; Aldrich Chemical Company), and two 500 cc columns in series packed with dried 5 Å mole sieves (8-12 mesh; Aldrich Chemical Company).

1-octene (98%) (Aldrich Chemical Company) was dried by stirring over NaK overnight followed by filtration through basic alumina (Aldrich Chemical Company, Brockman Basic 1).

Polymerization grade ethylene was used and further purified by passing it through a series of columns: 500 cc Oxyclear cylinder from Labclear (Oakland, Calif.) followed by a 500 cc column packed with dried 3 Å mole sieves (8-12 mesh; Aldrich Chemical Company), and a 500 cc column packed with dried 5 Å mole sieves (8-12 mesh; Aldrich Chemical Company).

Polymerization grade propylene was used and further purified by passing it through a series of columns: 2250 cc Oxiclear cylinder from Labclear followed by a 2250 cc column packed with 3 Å mole sieves (8-12 mesh; Aldrich Chemical Company), then two 500 cc columns in series packed with 5 Å mole sieves (8-12 mesh; Aldrich Chemical Company), the a 500 cc column packed with Selexsorb CD (BASF), and finally a 500 cc column packed with Selexsorb COS (BASF).

Activation of the pre-catalysts was by methylalumoxane (MAO, 10 wt % in toluene, Albemarle Corp.) MAO was used as a 0.5 wt % or 0.75 wt % in toluene solution. Micromoles of MAO reported in the experimental section are based on the micromoles of aluminum in MAO. The formula weight of MAO is 58.0 grams/mole.

Reactor Description and Preparation:

Polymerizations were conducted in an inert atmosphere (N$_2$) drybox using autoclaves equipped with an external heater for temperature control, glass inserts (internal volume of reactor=23.5 mL for C$_2$ and C$_2$/C$_8$ runs; 22.5 mL for C$_3$ runs), septum inlets, regulated supply of nitrogen, ethylene and propylene, and equipped with disposable PEEK mechanical stirrers (800 RPM). The autoclaves were prepared by purging with dry nitrogen at 110° C. or 115° C. for 5 hours and then at 25° C. for 5 hours.

Ethylene Polymerization (PE) or Ethylene/1-octene Copolymerization (EO):

The reactor was prepared as described above, and then purged with ethylene. For MAO activated runs, toluene, 1-octene (100 µL when used), and activator (MAO) were added via syringe at room temperature and atmospheric pressure. The reactor was then brought to process temperature (80° C.) and charged with ethylene to process pressure (75 psig=618.5 kPa or 200 psig=1480.3 kPa) while stirring at 800 RPM. The pre-catalyst solution was then added via syringe to the reactor at process conditions. Ethylene was allowed to enter (through the use of computer controlled solenoid valves) the autoclaves during polymerization to maintain reactor gauge pressure (+/−2 psig). Reactor temperature was monitored and typically maintained within +/−1° C. Polymerizations were halted by addition of approximately 50 psi O$_2$/Ar (5 mole % O$_2$) gas mixture to the autoclaves for approximately 30 seconds. The polymerizations were quenched after a predetermined cumulative amount of ethylene had been added or for a maximum of 30 minutes polymerization time. The reactors were cooled and vented. The polymer was isolated after the solvent was removed in-vacuo. The final conversion (quench value in psi) of ethylene added/consumed is reported in the Tables 1 (PE) and 2 (EO), in addition to the quench time for each run. Yields reported include total weight of polymer and residual catalyst. Catalyst activity is reported as grams of polymer per mmol transition metal compound per hour of reaction time (g/mmol·hr).

Propylene Polymerization:

The reactor was prepared as described above, then heated to 40° C. and then purged with propylene gas at atmospheric pressure. For MAO activated runs, toluene, MAO, and liquid propylene (1.0 mL) were added via syringe. The reactor was then heated to process temperature (70° C. or 100° C.) while stirring at 800 RPM. The pre-catalyst solution was added via syringe with the reactor at process conditions. Reactor temperature was monitored and typically maintained within +/−1° C. Polymerizations were halted by addition of approximately 50 psi O$_2$/Ar (5 mole % O$_2$) gas mixture to the autoclaves for approximately 30 seconds. The polymerizations were quenched based on a predetermined pressure loss of approximately 8 psi or for a maximum of 30 minutes polymerization time. The reactors were cooled and vented. The polymer was isolated after the solvent was removed in-vacuo. The quench time (s) and quench value (psi) are reported in Table 3 for each run. Yields reported include total weight of polymer and residual catalyst. Catalyst activity is reported as grams of polymer per mmol transition metal compound per hour of reaction time (g/mmol·hr).

Polymer Characterization

For analytical testing, polymer sample solutions were prepared by dissolving polymer in 1,2,4-trichlorobenzene (TCB, 99+% purity from Sigma-Aldrich) containing 2,6-di-tert-butyl-4-methylphenol (BHT, 99% from Aldrich) at 165° C. in a shaker oven for approximately 3 hours. The typical concentration of polymer in solution was between 0.1 to 0.9 mg/mL with a BHT concentration of 1.25 mg BHT/mL of TCB. Samples were cooled to 135° C. for testing.

High temperature size exclusion chromatography was performed using an automated "Rapid GPC" system as described in U.S. Pat. Nos. 6,491,816; 6,491,823; 6,475,391; 6,461,515; 6,436,292; 6,406,632; 6,175,409; 6,454,947; 6,260,407; and 6,294,388; each of which is incorporated herein by reference. Molecular weights (weight average molecular weight (Mw) and number average molecular weight (Mn)) and molecular weight distribution (MWD=Mw/Mn), which is also sometimes referred to as the polydispersity (PDI) of the polymer, were measured by Gel Permeation Chromatography using a Symyx Technology GPC equipped with evaporative light scattering detector and calibrated using polystyrene standards (Polymer Laboratories: Polystyrene Calibration Kit S-M-10: Mp (peak Mw) between 5000 and 3,390,000). Samples (250 µL of a polymer solution in TCB were injected into the system) were run at an eluent flow rate of 2.0 mL/minute (135° C. sample temperatures, 165° C. oven/columns) using three Polymer Laboratories: PLgel 10 μm Mixed-B 300×7.5 mm columns in series. No column spreading corrections were employed. Numerical analyses were performed using Epoch® software available from Symyx Technologies or Automation Studio software available from Freeslate. The molecular weights obtained are relative to linear polystyrene standards. Molecular weight data is reported in Tables 1, 2, and 3.

Differential Scanning calorimetry (DSC) measurements were performed on a TA-Q100 instrument to determine the melting point of the polymers. Samples were pre-annealed at 220° C. for 15 minutes and then allowed to cool to room temperature overnight. The samples were then heated to 220° C. at a rate of 100° C./minute and then cooled at a rate of 50° C./minute. Melting points were collected during the heating period. The results are reported in the Tables 1, 2 and 3 as $T_m$ (° C.).

Samples for infrared analysis were prepared by depositing the stabilized polymer solution onto a silanized wafer (Part number S10860, Symyx). By this method, approximately between 0.12 and 0.24 mg of polymer is deposited on the wafer cell. The samples were subsequently analyzed on a Brucker Equinox 55 FTIR spectrometer equipped with Pikes' MappIR specular reflectance sample accessory. Spectra, covering a spectral range of 5000 $cm^{-1}$ to 500 $cm^{-1}$, were collected at a 2 $cm^{-1}$ resolution with 32 scans.

For ethylene-1-octene copolymers, the wt % copolymer was determined via measurement of the methyl deformation band at ~1375 $cm^{-1}$. The peak height of this band was normalized by the combination and overtone band at ~4321 $cm^{-1}$, which corrects for path length differences. The normalized peak height was correlated to individual calibration curves from $^1$H NMR data to predict the wt % copolymer content within a concentration range of ~2 to 35 wt % for octene. Typically, $R^2$ correlations of 0.98 or greater are achieved. These numbers are reported in Table 2 under the heading C8 wt %). Reported values below 4.1 wt % are outside the calibration range.

Polymerization results are collected in Tables 1, 2, and 3 below. "Ex#" stands for example number. "Cat ID" identifies the pre-catalyst used in the experiment. Corresponding numbers identifying the pre-catalyst are located in the synthetic experimental section. "Catalyst (μmol)" is the amount of pre-catalyst added to the reactor. "Yield" is polymer yield, and is not corrected for catalyst residue. "Quench time (s)" is the actual duration of the polymerization run in seconds. "Quench Value (psi)" for ethylene based polymerization runs is the set maximum amount of ethylene uptake (conversion) for the experiment. If a polymerization quench time is 30 minutes or less, then the polymerization ran until the set maximum value of ethylene uptake was reached. For propylene based polymerization runs, quench value indicates the pressure loss (conversion) of propylene during the polymerization.

TABLE 1

Summary of conditions and polymer characterization data for ethylene homopolymerizations performed with complexes 1-5.

| Ex# | Cat ID | quench time (s) | yield (g) | Activity (g P/mmol cat · hr) | Mn (g/mol) | Mw (g/mol) | Mw/Mn | $T_m$ (° C.) |
|---|---|---|---|---|---|---|---|---|
| PE-1 | 1 | 200 | 0.068 | 48,960 | 181,283 | 692,175 | 3.82 | 134.7 |
| PE-2 | 1 | 229 | 0.070 | 44,017 | 153,626 | 717,955 | 4.67 | 134.8 |
| PE-3 | 1 | 229 | 0.062 | 38,987 | 193,541 | 702,713 | 3.63 | 134.7 |
| PE-4 | 2 | 359 | 0.115 | 46,128 | 227,572 | 864,469 | 3.80 | 135.5 |
| PE-5 | 2 | 349 | 0.123 | 50,751 | 286,657 | 945,980 | 3.30 | 135.6 |
| PE-6 | 2 | 336 | 0.122 | 52,286 | 221,873 | 871,766 | 3.93 | 135.5 |
| PE-7 | 3 | 496 | 0.068 | 19,742 | 242,998 | 975,974 | 4.02 | 134.9 |
| PE-8 | 3 | 405 | 0.061 | 21,689 | 229,327 | 951,915 | 4.15 | 134.6 |
| PE-9 | 3 | 360 | 0.053 | 21,200 | 288,840 | 1,019,985 | 3.53 | 134.5 |
| PE-10 | 4 | 754 | 0.041 | 7,830 | 145,481 | 867,607 | 5.96 | 134.6 |
| PE-11 | 4 | 633 | 0.043 | 9,782 | 131,914 | 871,964 | 6.61 | |
| PE-12 | 4 | 728 | 0.049 | 9,692 | 173,515 | 973,586 | 5.61 | 134.7 |
| PE-13 | 5 | 301 | 0.073 | 34,924 | 90,354 | 223,981 | 2.48 | 134.8 |
| PE-14 | 5 | 265 | 0.076 | 41,298 | 88,473 | 226,519 | 2.56 | 135.0 |
| PE-15 | 5 | 271 | 0.081 | 43,041 | 102,560 | 246,122 | 2.40 | 135.1 |

Reactor conditions: Pre-catalyst used at 0.025 umol and activated with 500 equivalents of MAO; 80° C. reactor temperature; 75 psid ethylene; 5.0 ml toluene; 800 rpm stir speed; reactor quenched at 20 psid ethylene (quench value) uptake or at a maximum time limit of 30 minutes.

TABLE 2

Summary of conditions and polymer characterization data for ethylene-octene copolymerizations performed with complexes 1-5.

| Ex# | Cat ID | C3 (psig) | quench time (s) | yield (g) | Activity (g P/mmol cat · hr) | Mn (g/mol) | Mw (g/mol) | Mw/Mn | C8 wt %* | $T_m$ (° C.) |
|---|---|---|---|---|---|---|---|---|---|---|
| EO-1 | 1 | 75 | 474 | 0.043 | 13,063 | 119,134 | 260,849 | 2.19 | 3.8 | 123.8 |
| EO-2 | 1 | 75 | 426 | 0.044 | 14,873 | 131,467 | 270,744 | 2.06 | 3.4 | 123.7 |
| EO-3 | 1 | 75 | 449 | 0.044 | 14,111 | 112,870 | 367,430 | 3.26 | 3.1 | 123.6 |
| EO-4 | 1 | 200 | 312 | 0.120 | 55,385 | 235,808 | 650,915 | 2.76 | 1.7 | 126.9 |
| EO-5 | 1 | 200 | 363 | 0.125 | 49,587 | 266,855 | 751,873 | 2.82 | 1.4 | 127.3 |
| EO-6 | 1 | 200 | 314 | 0.103 | 47,236 | 235,014 | 774,672 | 3.3 | 1.4 | 127.4 |
| EO-7 | 2 | 75 | 395 | 0.049 | 17,863 | 128,382 | 439,784 | 3.43 | 4.7 | 123.1 |
| EO-8 | 2 | 75 | 557 | 0.050 | 12,926 | 186,930 | 476,804 | 2.55 | 5.8 | 122.9 |
| EO-9 | 2 | 75 | 662 | 0.052 | 11,311 | 203,443 | 517,716 | 2.54 | 4.6 | 123.4 |

TABLE 2-continued

Summary of conditions and polymer characterization data for ethylene-octene copolymerizations performed with complexes 1-5.

| Ex# | Cat ID | C3 (psig) | quench time (s) | yield (g) | Activity (g P/mmol cat · hr) | Mn (g/mol) | Mw (g/mol) | Mw/Mn | C8 wt %* | $T_m$ (° C.) |
|---|---|---|---|---|---|---|---|---|---|---|
| EO-10 | 2 | 200 | 326 | 0.111 | 49,031 | 285,668 | 911,327 | 3.19 | 2.8 | 125.5 |
| EO-11 | 2 | 200 | 371 | 0.110 | 42,695 | 230,224 | 828,387 | 3.6 | 2.4 | 125.8 |
| EO-12 | 2 | 200 | 419 | 0.115 | 39,523 | 292,098 | 912,119 | 3.12 | 2.5 | 124.9 |
| EO-13 | 3 | 75 | 808 | 0.048 | 8,554 | 202,556 | 848,970 | 4.19 | 3.4 | 124.1 |
| EO-14 | 3 | 75 | 588 | 0.038 | 9,306 | 184,471 | 683,615 | 3.71 | 3.1 | 124.1 |
| EO-15 | 3 | 75 | 725 | 0.045 | 8,938 | 242,752 | 1,000,663 | 4.12 | 3.4 | 123.9 |
| EO-16 | 3 | 200 | 672 | 0.058 | 12,429 | 362,575 | 1,224,852 | 3.38 | 1.1 | 127.9 |
| EO-17 | 3 | 200 | 509 | 0.057 | 16,126 | 500,557 | 1,417,445 | 2.83 | 1.3 | 127.9 |
| EO-18 | 3 | 200 | 1800 | 0.006 | 480 | | | | | |
| EO-19 | 4 | 75 | 986 | 0.046 | 6,718 | 157,029 | 660,140 | 4.2 | 8.6 | 119.0 |
| EO-20 | 4 | 75 | 1290 | 0.040 | 4,465 | 120,442 | 791,286 | 6.57 | 8.2 | 119.2 |
| EO-21 | 4 | 75 | 1091 | 0.036 | 4,752 | 139,383 | 663,959 | 4.76 | 6.7 | 118.9 |
| EO-22 | 4 | 200 | 646 | 0.056 | 12,483 | 185,963 | 858,186 | 4.61 | 2.6 | |
| EO-23 | 4 | 200 | 682 | 0.066 | 13,935 | 263,198 | 934,290 | 3.55 | 3.0 | 123.4 |
| EO-24 | 4 | 200 | 536 | 0.060 | 16,119 | 281,531 | 1,129,537 | 4.01 | 4.0 | 124.2 |
| EO-25 | 5 | 75 | 252 | 0.081 | 46,286 | 118,641 | 279,745 | 2.36 | 10.8 | 114.9 |
| EO-26 | 5 | 75 | 244 | 0.077 | 45,443 | 107,403 | 261,693 | 2.44 | 13.5 | 114.9 |
| EO-27 | 5 | 75 | 229 | 0.089 | 55,965 | | | | | |
| EO-28 | 5 | 200 | 167 | 0.124 | 106,922 | 169,782 | 374,760 | 2.21 | 3.1 | 122.8 |
| EO-29 | 5 | 200 | 173 | 0.110 | 91,561 | 178,039 | 364,060 | 2.04 | 2.5 | 123.5 |
| EO-30 | 5 | 200 | 196 | 0.109 | 80,082 | 159,358 | 359,119 | 2.25 | 3.9 | 122.8 |

Reactor conditions: Pre-catalyst used at 0.025 umol and activated with 500 equivalence of MAO; 80° C. reactor temperature; 100 uL 1-octene; 4.9 ml toluene; 800 rpm stir speed; reactor quenched at 20 psid ethylene (quench value) uptake for runs at 75 psid ethylene or 15 psid ethylene uptake for runs at 200 psid ethylene, or at a maximum time limit of 30 minutes.
*wt % octene less than 4.1 wt % was outside the calibration range for the FTIR.

TABLE 3

Summary of conditions and polymer characterization data for propylene polymerizations performed with complexes 1-5.

| Ex# | Cat ID | Catalyst (umol) | T (C.) | quench time (s) | yield (g) | Activity (g P/mmol cat · hr) | Mn (g/mol) | Mw (g/mol) | Mw/Mn | $T_m$ (° C.) |
|---|---|---|---|---|---|---|---|---|---|---|
| PP-1 | 1 | 0.04 | 70 | 1800 | 0.005 | 250 | | | | |
| PP-2 | 1 | 0.04 | 70 | 1801 | 0.005 | 250 | | | | |
| PP-3 | 1 | 0.04 | 70 | 1801 | 0.004 | 200 | | | | |
| PP-4 | 1 | 0.04 | 100 | 1801 | 0.004 | 200 | | | | |
| PP-5 | 1 | 0.04 | 100 | 1801 | 0.005 | 250 | | | | |
| PP-6 | 1 | 0.04 | 100 | 1801 | 0.005 | 250 | | | | |
| PP-7 | 2 | 0.04 | 70 | 1801 | 0.003 | 150 | | | | |
| PP-8 | 2 | 0.04 | 70 | 1800 | 0.003 | 150 | | | | |
| PP-9 | 2 | 0.04 | 70 | 1800 | 0.003 | 150 | | | | |
| PP-10 | 2 | 0.04 | 100 | 1801 | 0.003 | 150 | | | | |
| PP-11 | 2 | 0.04 | 100 | 1801 | 0.004 | 200 | | | | |
| PP-12 | 2 | 0.04 | 100 | 1801 | 0.003 | 150 | | | | |
| PP-13 | 3 | 0.08 | 70 | 1800 | 0.007 | 175 | | | | |
| PP-14 | 3 | 0.08 | 70 | 1801 | 0.007 | 175 | | | | |
| PP-15 | 3 | 0.08 | 70 | 1801 | 0.007 | 175 | | | | |
| PP-16 | 3 | 0.08 | 100 | 1801 | 0.007 | 175 | | | | |
| PP-17 | 3 | 0.08 | 100 | 1801 | 0.007 | 175 | | | | |
| PP-18 | 3 | 0.08 | 100 | 1801 | 0.007 | 175 | | | | |
| PP-19 | 4 | 0.08 | 70 | 1804 | 0.036 | 898 | 29,701 | 249,087 | 8.39 | 138.6 |
| PP-20 | 4 | 0.08 | 70 | 1800 | 0.037 | 925 | 20,538 | 265,554 | 12.93 | 138.9 |
| PP-21 | 4 | 0.08 | 70 | 1801 | 0.034 | 850 | 36,935 | 272,014 | 7.36 | 139.2 |
| PP-22 | 4 | 0.08 | 100 | 1801 | 0.035 | 875 | 11,892 | 81,342 | 6.84 | 139.6 |
| PP-23 | 4 | 0.08 | 100 | 1802 | 0.034 | 849 | 10,992 | 77,487 | 7.05 | 139.6 |
| PP-24 | 4 | 0.08 | 100 | 1800 | 0.032 | 800 | 10,681 | 65,463 | 6.13 | 139.8 |
| PP-25 | 5 | 0.08 | 70 | 433 | 0.079 | 8,210 | 23,654 | 54,480 | 2.30 | 131.4 |
| PP-26 | 5 | 0.08 | 70 | 490 | 0.091 | 8,357 | 25,103 | 60,456 | 2.41 | 126.5 |
| PP-27 | 5 | 0.08 | 70 | 477 | 0.096 | 9,057 | 27,961 | 61,642 | 2.20 | 132.1 |
| PP-28 | 5 | 0.08 | 100 | 103 | 0.174 | 76,019 | 22,215 | 49,730 | 2.24 | 125.6 |
| PP-29 | 5 | 0.08 | 100 | 104 | 0.173 | 74,856 | 17,709 | 47,674 | 2.69 | 119.9 |
| PP-30 | 5 | 0.08 | 100 | 103 | 0.171 | 74,709 | 12,833 | 47,411 | 3.69 | 125.0 |

Pre-catalyst activated with 500 equivalence of MAO; 5.1 ml toluene; 1.0 ml C3; 800 rpm stir speed; reactor quenched at 8 psid pressure loss (quench value) or at a maximum time limit of 30 minutes.
Catalysts 4 and 5 produced isotactic polypropylene.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise, whenever a composition, an element, or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A transition metal compound formed by the chelation of a tridentate dianionic heterocyclic amido ligand to a group 3, 4, or 5 transition metal, where the tridentate ligand coordinates to the metal forming a five-membered ring and an eight-membered ring.

2. A heterocyclic amido transition metal complex represented by the formula (A) or (B):

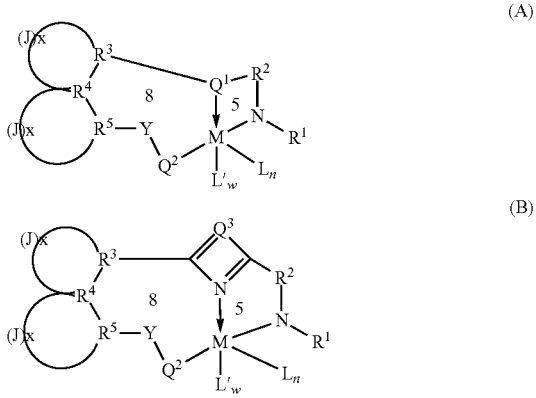

wherein:

M is a Group 3, 4, or 5 metal;

$Q^1$ is a group that links $R^2$ and $R^3$ by a three atom bridge represented by the formula:
-$G^1$-$G^2$-$G^3$- where $G^2$ is a group 15 or 16 atom that forms a dative bond to M, $G^1$ and $G^3$ are each a group 14 atom that are joined together by two or three additional group 14, 15, or 16 atoms to form a heterocycle or substituted heterocycle;

$Q^2$ is a group that forms an anionic bond with M, said $Q^2$ group being selected from O, S, $CH_2$, $CHR^{17}$, $C(R^{17})_2$, $NR^{17}$ or $PR^{17}$, where each $R^{17}$ is independently selected from hydrogen, halogen, hydrocarbyls, substituted hydrocarbyls, halocarbyls, substituted halocarbyls, silylcarbyls, and polar groups;

$Q^3$ is -(TT)- or -(TTT)-, where each T is a substituted or unsubstituted group 14, 15, or 16 element so that together with the "—C—N═C—" fragment it forms a 5- or 6-membered heterocycle or substituted heterocycle;

$R^1$ is selected from hydrocarbyls, substituted hydrocarbyls, halocarbyls, substituted halocarbyls, and silylcarbyls;

$R^2$ is -$E(R^{12})(R^{13})$— where E is carbon, silicon, or germanium, and each $R^{12}$ and $R^{13}$ is independently selected from the group consisting of hydrogen, halogen, hydrocarbyls, substituted hydrocarbyls, halocarbyls, substituted halocarbyls, silylcarbyls, substituted and polar groups;

$R^3$ is either C or N, and $R^4$ and $R^5$ are C, and $R^3$ and $R^4$ are part of a five or six-membered carbocyclic or heterocyclic ring, which may be substituted or unsubstituted, and $R^4$ and $R^5$ are part of a five or six-membered carbocyclic or heterocyclic ring, which may be substituted or unsubstituted;

each J is independently selected from C, CH, $CH_2$, $CR^{18}$, $CHR^{18}$, $C(R^{18})_2$, $Si(R^{18})_2$, $SiH(R^{18})$, NH, $NR^{18}$, O, or S, where $R^{18}$ is selected from hydrocarbyls, substituted hydrocarbyls, halocarbyls, substituted halocarbyls, halogen, and silylcarbyls;

each x is independently 3 or 4 representing the number of J groups linked together in series;

Y is selected from substituted and unsubstituted group 14 elements;

L is an anionic leaving group, where the L groups may be the same or different and any two L groups may be linked to form a dianionic leaving group;

L' is neutral Lewis base;

n is 1, 2, or 3;

w is 0, 1, 2, or 3;

wherein n+w is not greater than 4; and wherein the tridentate dianionic ligand is chelated to the metal M in such a fashion that the complex features an eight-membered chelate ring and a five-membered chelate ring, which are indicated in the formulas (A) and (B) by the numbers 8 and 5, respectively.

3. The complex of claim 2 wherein $Q^2$ is $CH_2$, CHMe, CHEt, CHBu, CH(pentyl), CH(hexyl), CH(hexyl), CH(octyl), CH(nonyl), CH(decyl), or CHPh, O, N(Ph), N(Mesityl), N(2,6-dimethylphenyl), N(2,6-diethylphenyl), N(2-methylphenyl), N(2-ethylphenyl), N(butyl), N(propyl), N(isopropyl), N(cyclohexyl), N(t-butyl), or N(2,6-diisopropylphenyl).

4. The complex of claim 2, wherein $Q^2$ and Y are each independently $CH_2$ or CH(hydrocarbyl), where each hydrocarbyl group contains 1 to 20 carbon atoms.

5. The complex of claim 2 wherein $Q^2$ is not $CH_2$, CH(hydrocarbyl), or C(hydrocarbyl)$_2$, where the hydrocarbyl groups are independently selected from groups that contain 1 to 20 carbon atoms.

6. A heterocyclic amido transition metal complex represented by the formula (C) or (D):

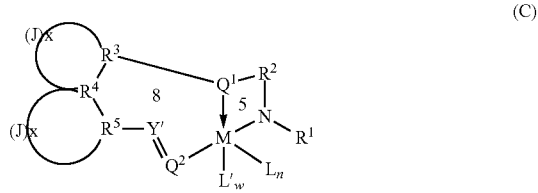

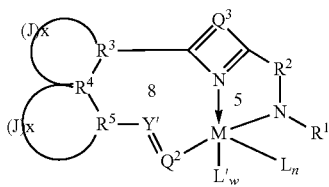

(D)

wherein:

M is a Group 3, 4, or 5 metal;

$Q^1$ is a group that links $R^2$ and $R^3$ by a three atom bridge represented by the formula:

-$G^1$-$G^2$-$G^3$- where $G^2$ is a group 15 or 16 atom that forms a dative bond to M, $G^1$ and $G^3$ are each a group 14 atom that are joined together by two or three additional group 14, 15, or 16 atoms to form a heterocycle or substituted heterocycle;

$Q^{2'}$ is a group that forms an anionic bond with M, said $Q^{2'}$ group being selected from N, P, CH, $CR^{17}$, where each $R^{17}$ is independently selected from hydrogen, halogen, hydrocarbyls, substituted hydrocarbyls, halocarbyls, substituted halocarbyls, silylcarbyls, and polar groups;

$Q^3$ is -(TT)- or -(TTT)-, where each T is a substituted or unsubstituted group 14, 15, or 16 element so that together with the "—C—N=C—" fragment it forms a 5- or 6-membered heterocycle or substituted heterocycle;

$R^1$ is selected from hydrocarbyls, substituted hydrocarbyls, halocarbyls, substituted halocarbyls, and silylcarbyls;

$R^2$ is -$E(R^{12})(R^{13})$— where E is carbon, silicon, or germanium, and each $R^{12}$ and $R^{13}$ is independently selected from the group consisting of hydrogen, halogen, hydrocarbyls, substituted hydrocarbyls, halocarbyls, substituted halocarbyls, silylcarbyls, substituted and polar groups;

$R^3$ is either C or N, and $R^4$ and $R^5$ are C, and $R^3$ and $R^4$ are part of a five or six-membered carbocyclic or heterocyclic ring, which may be substituted or unsubstituted, and $R^4$ and $R^5$ are part of a five or six-membered carbocyclic or heterocyclic ring, which may be substituted or unsubstituted;

each J is independently selected from C, CH, $CH_2$, $CR^{18}$, $CHR^{18}$, $C(R^{18})_2$, $Si(R^{18})_2$, $SiH(R^{18})$, NH, $NR^{18}$, O, or S, where $R^{18}$ is selected from hydrocarbyls, substituted hydrocarbyls, halocarbyls, substituted halocarbyls, halogen, and silylcarbyls;

each x is independently 3 or 4 representing the number of J groups linked together in series;

Y' is selected from substituted and unsubstituted group 14 elements;

L is an anionic leaving group, where the L groups may be the same or different and any two L groups may be linked to form a dianionic leaving group;

L' is neutral Lewis base;

n is 1, 2, or 3;

w is 0, 1, 2, or 3;

wherein n+w is not greater than 4; and wherein the tridentate dianionic ligand is chelated to the metal M in such a fashion that the complex features an eight-membered chelate ring and a five-membered chelate ring, which are indicated in the formulas (C) and (D) by the numbers 8 and 5, respectively.

7. The complex of claim 2, wherein M is Ti, Zr, or Hf.

8. The complex of claim 2, wherein $R^2$ is represented by the formula:

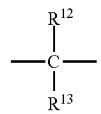

where $R^{12}$ is hydrogen, alkyl, aryl, or halogen; and $R^{13}$ is hydrogen, alkyl, aryl, or halogen.

9. The complex of claim 2, wherein $R^1$ is selected from phenyl groups that are substituted with 0, 1, 2, 3, 4, or 5 substituents selected from the group consisting of F, Cl, Br, I, $CF_3$, $NO_2$, alkoxy, dialkylamino, aryl, and alkyl groups having 1 to 10 carbons.

10. The complex of claim 2, wherein each J is selected from C, CH, $CH_2$, $Si(R^{18})_2$, $SiH(R^{18})$, $NR^{18}$, O, or S, where $R^{18}$ is selected from hydrocarbyls, substituted hydrocarbyls, and silylcarbyls.

11. The complex of claim 2, wherein the complex is represented by the formula:

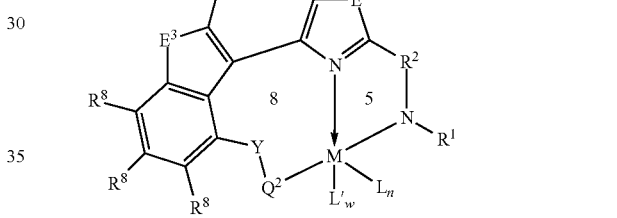

(E)

wherein:

M, $R^1$, $R^2$, L, L', n, w, Y, and $Q^2$ are defined in claim 2;

$E^2$ and $E^3$ are independently selected from O, S, NH, or $NR^9$, where $R^9$ is a hydrocarbyl, substituted hydrocarbyl, halocarbyl, substituted halocarbyl, halogen, silylcarbyl, or polar group;

each $R^7$ is independently selected from hydrogen, halogen, hydrocarbyl, substituted hydrocarbyl, halocarbyl, substituted halocarbyl, silylcarbyl, and polar groups;

each $R^8$ is independently selected from hydrogen, halogen, hydrocarbyl, substituted hydrocarbyl, halocarbyl, substituted halocarbyl, silylcarbyl, and polar groups.

12. The complex of claim 2, wherein the complex is represented by the formula:

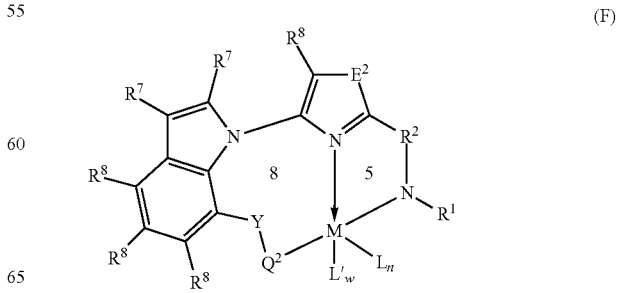

(F)

wherein M, $R^1$, $R^2$, L, L', n, w, Y, and $Q^2$ are defined in claim 2; $E^2$ is selected from O, S, NH, or $NR^9$, where $R^9$ is a hydrocarbyl, substituted hydrocarbyl, halocarbyl, substituted halocarbyl, halogen, silylcarbyl, or polar group;

each $R^7$ is independently selected from hydrogen, halogen, hydrocarbyl, substituted hydrocarbyl, halocarbyl, substituted halocarbyl, silylcarbyl, and polar groups;

each $R^8$ is independently selected from hydrogen, halogen, hydrocarbyl, substituted hydrocarbyl, halocarbyl, substituted halocarbyl, silylcarbyl, and polar groups.

13. The complex of claim 2, wherein the complex is represented by the formula:

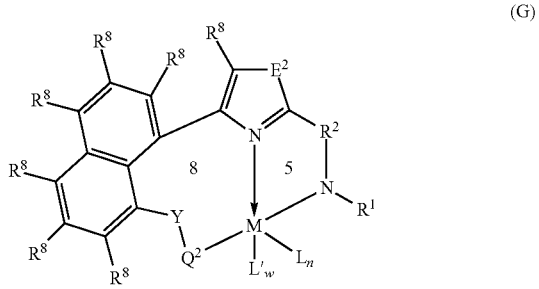

(G)

wherein M, $R^1$, $R^2$, L, L', n, w, Y, and $Q^2$ are defined in claim 2; $E^2$ is selected from O, S, NH, or $NR^9$, where $R^9$ is a hydrocarbyl, substituted hydrocarbyl, halocarbyl, substituted halocarbyl, halogen, silylcarbyl, or polar group;

each $R^8$ is independently selected from hydrogen, halogen, hydrocarbyl, substituted hydrocarbyl, halocarbyl, substituted halocarbyl, silylcarbyl, and polar groups.

14. The complex of claim 6, wherein the complex is represented by the formula:

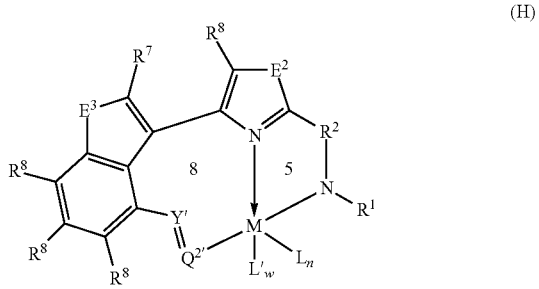

(H)

M, $R^1$, $R^2$, L, L', n, w, $R^{17}$, and $R^{18}$ are as defined in claim 6; Y' is CH or $C(R^{18})$; $Q^{2'}$ is selected from N, P, CH, or $CR^{17}$; $E^2$ and $E^3$ are independently selected from O, S, NH, or $NR^9$, where $R^9$ is a hydrocarbyl, substituted hydrocarbyl, halocarbyl, substituted halocarbyl, halogen, silylcarbyl, or polar group;

each $R^7$ is independently selected from hydrogen, halogen, hydrocarbyl, substituted hydrocarbyl, halocarbyl, substituted halocarbyl, silylcarbyl, and polar groups;

each $R^8$ is independently selected from hydrogen, halogen, hydrocarbyl, substituted hydrocarbyl, halocarbyl, substituted halocarbyl, silylcarbyl, and polar groups.

15. The complex of claim 6, wherein the complex is represented by the formula:

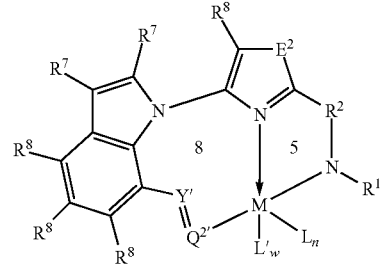

(I)

M, $R^1$, $R^2$, L, L', n, w, $R^{17}$, and $R^{18}$ are as defined in claim 6; Y' is CH or $C(R^{18})$; $Q^{2'}$ is selected from N, P, CH, or $CR^{17}$; $E^2$ is independently selected from O, S, NH, or $NR^9$, where $R^9$ is a hydrocarbyl, substituted hydrocarbyl, halocarbyl, substituted halocarbyl, halogen, silylcarbyl, or polar group;

each $R^7$ is independently selected from hydrogen, halogen, hydrocarbyl, substituted hydrocarbyl, halocarbyl, substituted halocarbyl, silylcarbyl, and polar groups;

each $R^8$ is independently selected from hydrogen, halogen, hydrocarbyl, substituted hydrocarbyl, halocarbyl, substituted halocarbyl, silylcarbyl, and polar groups.

16. The complex of claim 6, wherein the complex is represented by the formula:

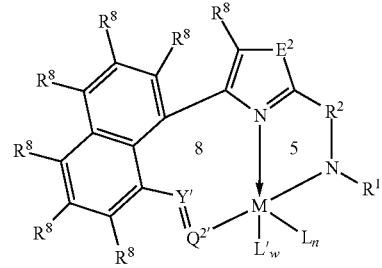

(J)

M, $R^1$, $R^2$, L, n, w, $R^{17}$, and $R^{18}$ are as defined in claim 6; Y' is CH or $C(R^{18})$; $Q^{2'}$ is selected from N, P, CH, or $CR^{17}$; $E^2$ is selected from O, S, NH, or $NR^9$, where $R^9$ is a hydrocarbyl, substituted hydrocarbyl, halocarbyl, substituted halocarbyl, halogen, silylcarbyl, or polar group;

each $R^8$ is independently selected from hydrogen, halogen, hydrocarbyl, substituted hydrocarbyl, halocarbyl, substituted halocarbyl, silylcarbyl, and polar groups.

17. A catalyst system comprising an activator and the heterocyclic amido transition metal compound of claim 1.

18. A catalyst system comprising an activator and the heterocyclic amido transition metal complex of claim 2.

19. The catalyst system of claim 17 wherein the activator comprises a non-coordinating anion and/or an alumoxane.

20. The catalyst system of claim 17, wherein the catalyst system is supported.

21. The catalyst system of claim 17, wherein M is Hf or Zr.

22. A polymerization process to produce polyolefin comprising contacting one or more olefin monomers with the catalyst system of claim 17 and recovering olefin polymer.

23. The process of claim 22, wherein the monomer comprises ethylene.

24. The process of claim 22, wherein the monomer comprises propylene.

25. The process of claim 22, wherein the process is a solution process.

26. The process of claim 22, wherein the process is a gas phase or slurry process.

27. A polymerization process to produce polyolefin comprising contacting one or more olefin monomers with a catalyst system comprising an activator and the heterocyclic amido transition metal complex of claim 2, wherein the process is a gas phase or slurry process.

28. The complex of claim 6, wherein M is Ti, Zr, or Hf.

29. The complex of claim 6, wherein $R^2$ is represented by the formula:

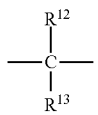

where $R^{12}$ is hydrogen, alkyl, aryl, or halogen; and $R^{13}$ is hydrogen, alkyl, aryl, or halogen.

30. The complex of claim 6, wherein $R^1$ is selected from phenyl groups that are substituted with 0, 1, 2, 3, 4, or 5 substituents selected from the group consisting of F, Cl, Br, I, $CF_3$, $NO_2$, alkoxy, dialkylamino, aryl, and alkyl groups having 1 to 10 carbons.

31. The complex of claim 6, wherein each J is selected from C, CH, $CH_2$, $Si(R^{18})_2$, $SiH(R^{18})$, $NR^{18}$, O, or S, where $R^{18}$ is selected from hydrocarbyls, substituted hydrocarbyls, and silylcarbyls.

32. The complex of claim 6, wherein $Q^{2'}$ is N, CH or $CR^{17}$ where $R^{17}$ is selected from alkyls and aryls, heteroaryls and silylcarbyl groups.

33. The complex of claim 6, wherein $Q^{2'}$ is N, CH or $CR^{17}$ where $R^{17}$ is a phenyl group or a substituted phenyl group substituted with between one to five substituents selected from F, Cl, Br, I, $CF_3$, $NO_2$, alkoxy, dialkylamino, aryl, and alkyl groups having 1 to 10 carbons.

34. The complex of claim 6, wherein $Q^{2'}$ is N, P, CH, C(Ph), C(Me), C(t-Bu), or C(i-Pr).

35. The complex of claim 6, wherein, $Q^{2'}$ and Y' are each independently CH or C(hydrocarbyl), where each hydrocarbyl group contains 1 to 20 carbon atoms.

36. The complex of claim 6, wherein M is zirconium or hafnium, L is a hydrocarbyl group containing 1 to 6 carbons, n is 2, w is 0, and $Q^{2'}$ is nitrogen.

37. A catalyst system comprising an activator and the heterocyclic amido transition metal complex of claim 6.

38. A catalyst system comprising an activator and the heterocyclic amido transition metal complex of claim 11.

39. A catalyst system comprising an activator and the heterocyclic amido transition metal complex of claim 12.

40. A catalyst system comprising an activator and the heterocyclic amido transition metal complex of claim 13.

41. A catalyst system comprising an activator and the heterocyclic amido transition metal complex of claim 14.

42. A catalyst system comprising an activator and the heterocyclic amido transition metal complex of claim 15.

43. A catalyst system comprising an activator and the heterocyclic amido transition metal complex of claim 16.

44. The catalyst system of claim 18 wherein the activator comprises a non- coordinating anion and/ or an alumoxane.

45. The catalyst system of claim 18, wherein the catalyst system is supported.

46. A polymerization process to produce polyolefin comprising contacting one or more olefin monomers with the catalyst system of claim 18 and recovering olefin polymer.

47. The process of claim 46, wherein the monomer comprises ethylene.

48. The process of claim 46, wherein the monomer comprises propylene.

49. The process of claim 46, wherein the process is a solution process.

* * * * *